United States Patent
Lee et al.

(10) Patent No.: US 12,363,451 B2
(45) Date of Patent: Jul. 15, 2025

(54) COLOR INTERPOLATION METHOD FOR MULTISPECTRAL FILTER ARRAY AND IMAGE ACQUISITION DEVICE

(71) Applicants: SAMSUNG ELECTRONICS CO., LTD., Suwon-si (KR); UIF (University Industry Foundation), Yonsei University, Seoul (KR)

(72) Inventors: Sangyoon Lee, Suwon-si (KR); Moongi Kang, Seoul (KR); Woo-Shik Kim, Suwon-si (KR); Kyeonghoon Jeong, Seoul (KR)

(73) Assignees: SAMSUNG ELECTRONICS CO., LTD., Suwon-si (KR); UIF (University Industry Foundation), Yonsei University, Seoul (KR)

( * ) Notice: Subject to any disclaimer, the term of this patent is extended or adjusted under 35 U.S.C. 154(b) by 0 days.

(21) Appl. No.: 18/511,660

(22) Filed: Nov. 16, 2023

(65) Prior Publication Data
US 2024/0323549 A1    Sep. 26, 2024

(30) Foreign Application Priority Data
Mar. 24, 2023  (KR) .................. 10-2023-0039264
Apr. 20, 2023  (KR) .................. 10-2023-0052210

(51) Int. Cl.
*H04N 23/84*    (2023.01)
*H04N 23/10*    (2023.01)
(Continued)

(52) U.S. Cl.
CPC .......... *H04N 23/843* (2023.01); *H04N 23/10* (2023.01); *H04N 23/11* (2023.01); *H04N 23/30* (2023.01);
(Continued)

(58) Field of Classification Search
None
See application file for complete search history.

(56) References Cited

U.S. PATENT DOCUMENTS

2008/0075394 A1    3/2008  Huang et al.
2016/0373664 A1*  12/2016  Wei ...................... H04N 25/131
(Continued)

FOREIGN PATENT DOCUMENTS

CN    108288256 A    7/2018
CN    114240776 A    3/2022
(Continued)

OTHER PUBLICATIONS

Lu et al., "Color Filter Array Demosaicking: New Method and Performance Measures," IEEE Transactions on Image Processing, vol. 12, No. 10, Oct. 2003, (17 Total Pages).
(Continued)

*Primary Examiner* — David N Werner
(74) *Attorney, Agent, or Firm* — Sughrue Mion, PLLC

(57) ABSTRACT

Provided are a color interpolation method and an image acquisition device for a multispectral filter array. The color interpolation method includes acquiring a raw multispectral image on the basis of a multispectral filter array, generating a guide image for color interpolation of the raw multispectral image, generating a difference image between the raw multispectral image and the guide image, generating a demosaiced difference image by performing color interpolation based on the difference image, and generating a demosaiced multispectral image based on the demosaiced difference image and the guide image.

19 Claims, 35 Drawing Sheets

(51) Int. Cl.
  *H04N 23/11* (2023.01)
  *H04N 23/30* (2023.01)
  *H04N 25/11* (2023.01)
  *H04N 25/131* (2023.01)
  *H04N 25/133* (2023.01)
  *H04N 25/30* (2023.01)
  *G06T 3/4015* (2024.01)

(52) U.S. Cl.
  CPC ........... *H04N 25/11* (2023.01); *H04N 25/131* (2023.01); *H04N 25/133* (2023.01); *H04N 25/30* (2023.01); *G06T 3/4015* (2013.01)

(56) References Cited

U.S. PATENT DOCUMENTS

| | | | |
|---|---|---|---|
| 2017/0064275 A1* | 3/2017 | Chen | H04N 25/131 |
| 2017/0280122 A1* | 9/2017 | Sato | H04N 23/74 |
| 2018/0184055 A1* | 6/2018 | Kikuchi | H04N 25/131 |
| 2018/0197274 A1* | 7/2018 | Price | G06T 7/55 |
| 2018/0197275 A1* | 7/2018 | Price | H04N 23/11 |
| 2018/0350860 A1* | 12/2018 | Mao | H04N 25/58 |
| 2018/0359432 A1* | 12/2018 | Horak | H04N 23/21 |
| 2019/0078937 A1* | 3/2019 | Siddiqui | H04N 25/135 |
| 2019/0141238 A1* | 5/2019 | Zhou | H04N 25/131 |
| 2020/0228742 A1* | 7/2020 | Magnani | H10F 39/8053 |
| 2020/0265558 A1* | 8/2020 | Qiu | H04N 23/11 |
| 2020/0413012 A1 | 12/2020 | Alleysson et al. | |
| 2021/0029331 A1* | 1/2021 | Koga | G06T 7/11 |
| 2021/0197608 A1* | 7/2021 | Nishizawa | B05D 5/067 |
| 2021/0211616 A1* | 7/2021 | Wang | H04N 23/55 |
| 2021/0241421 A1 | 8/2021 | Pan et al. | |
| 2022/0198604 A1* | 6/2022 | Dabral | H04N 23/667 |
| 2023/0095645 A1* | 3/2023 | Perrin | H04N 25/131 348/164 |
| 2023/0116000 A1* | 4/2023 | Novikov | H04N 25/134 348/273 |
| 2023/0334818 A1* | 10/2023 | Yang | G06V 10/56 |
| 2024/0040268 A1* | 2/2024 | Garud | H04N 23/11 |

FOREIGN PATENT DOCUMENTS

| | | |
|---|---|---|
| CN | 112005545 B | 10/2022 |
| KR | 10-1794726 B1 | 11/2017 |
| WO | 2021/003594 A1 | 1/2021 |

OTHER PUBLICATIONS

Kiku et al., "Residual Interpolation for Color Image Demosaicking," Tokyo Institute of Technology, ICIP, IEEE, 2013 (5 total pages).

Ron Kimmel, "Demosaicing: Image Reconstruction from Color CCD Samples," IEEE Transaction on image processing, 1998 (13 total pages).

Miao et al., "Generic MSFA mosaicking and demosaicking for multispectral cameras", Proceedings of SPIE—The International Society for Optical Engineering, Feb. 2, 2006, 10 total pages, vol. 6069, XP093182452, doi:10.1117/12.642366.

Fu et al., "Hyperspectral Image Super-Resolution With a Mosaic RGB Image", IEEE Transactions on Image Processing, Nov. 1, 2018, pp. 5539-5552, vol. 27, XP011688821, ISSN: 1057-7149, doi:10.1109/TIP.2018.2855412.

Lapray et al., "Multispectral Filter Arrays: Recent Advances and Practical Implementation", Sensors, Nov. 17, 2014, pp. 21626-21659, vol. 14, XP055715395, doi:10.3390/s141121626.

Communication dated Jul. 15, 2024, issued by European Patent Office in European Patent Application No. 24152860.3.

* cited by examiner

FIG. 3A

| 10 | 12 | 14 | 16 | 10 | 12 | 14 | 16 |   |   |
|----|----|----|----|----|----|----|----|---|---|
| 9  | 11 | 13 | 15 | 9  | 11 | 13 | 15 |   |   |
| 2  | 4  | 6  | 8  | 2  | 4  | 6  | 8  |   |   |
| 1  | 3  | 5  | 7  | 1  | 3  | 5  | 7  |   |   |
| 10 | 12 | 14 | 16 | 10 | 12 | 14 | 16 | · | · |
| 9  | 11 | 13 | 15 | 9  | 11 | 13 | 15 |   |   |
| 2  | 4  | 6  | 8  | 2  | 4  | 6  | 8  |   |   |
| 1  | 3  | 5  | 7  | 1  | 3  | 5  | 7  |   |   |
|    |    |    |    | ·  |    |    |    |   |   |
|    |    |    |    | ·  |    |    |    |   |   |

COLOR INTERPOLATION METHOD FOR MULTISPECTRAL FILTER ARRAY AND IMAGE ACQUISITION DEVICE

CROSS-REFERENCE TO RELATED APPLICATIONS

This application is based on and claims priority under 35 U.S.C. § 119 to Korean Patent Application Nos. 10-2023-0039264, filed on Mar. 24, 2023, and 10-2023-0052210, filed on Apr. 20, 2023, in the Korean Intellectual Property Office, the disclosures of which are incorporated by reference herein in their entireties.

BACKGROUND

1. Field

This disclosure relates to a color interpolation method and an image acquisition device for a multispectral filter array (MSFA). More specifically, the disclosure relates to a color interpolation method applicable to various multispectral filter arrays (MSFAs).

2. Related Art

MSFAs are used in advanced industries such as satellite imagery for weather observation, military satellite imagery, agriculture, food analysis, and medical imagery. Light passing through an MSFA provides specific color information for respective channels. Color interpolation refers to the process of completing colors for a mosaic image acquired through a color filter array. Color interpolation is essential in obtaining a demosaiced image.

Unlike Bayer filter arrays, MSFAs have a narrow band of spectra for each channel and a large number of channels. Accordingly, spectral correlation and spatial correlation between pieces of the color information of channels of MSFAs are low, and thus, a Bayer-based color interpolation method may not be directly applied to MSFAs. A neural network-based color interpolation method has the disadvantage of having to re-learn the neural network when the number of channels or channel characteristics of the MSFAs change. Accordingly, a color interpolation method suitable for MSFAs is required.

SUMMARY

Provided are a color interpolation method and an image acquisition device for MSFAs.

Additional aspects will be set forth in part in the description which follows and, in part, will be apparent from the description, or may be learned by practice of the presented example embodiments of the disclosure.

According to an aspect of an embodiment, provided is a color interpolation method for a MSFA.

The color interpolation method may include acquiring a raw multispectral image based on a multispectral filter array (MSFA), generating a guide image for color interpolation of the raw multispectral image, generating a difference image between the raw multispectral image and the guide image, generating a demosaiced difference image by performing color interpolation based on the difference image, and generating a demosaiced multispectral image based on the demosaiced difference image and the guide image.

According to another aspect of an embodiment, provided is an image acquisition device.

The image acquisition device may include a multispectral image sensor (MIS) including a multispectral filter array (MSFA) and a processor, wherein the processor is configured to acquire a raw multispectral image from the MIS, generate a guide image for color interpolation of the raw multispectral image, generate a difference image between the raw multispectral image and the guide image, generate a demosaiced difference image by performing color interpolation based on the difference image, and generate a demosaiced multispectral image based on the demosaiced difference image and the guide image.

According to an aspect of an embodiment, provided is a color interpolation method for a MSFA.

The color interpolation method may include acquiring a raw multispectral image based on a multispectral filter array (MSFA), generating a guide image for color interpolation of the raw multispectral image, and generating a demosaiced multispectral image by performing color interpolation based on the raw multispectral image by using the guide image, wherein the generating of the demosaiced multispectral image includes a first operation of setting reference pixels of the demosaiced multispectral image from the pixels of the raw multispectral image corresponding to a reference color channel, a second operation of selecting target pixels located at the same distance from two or more adjacent reference pixels in the raw multispectral image, a third operation of generating a pixel value of a target pixel based on pixel values of reference pixels adjacent to the target pixel for each target pixel, a fourth operation in which the target pixels are included among the reference pixels, and an operation of repeating the second to fourth operations.

BRIEF DESCRIPTION OF THE DRAWINGS

The above and other aspects, features, and advantages of example embodiments of the disclosure will be more apparent from the following description taken in conjunction with the accompanying drawings, in which:

FIG. 3A shows an arrangement of channels of image data of raw spectral image data according to embodiments.

DETAILED DESCRIPTION

Figure 1:
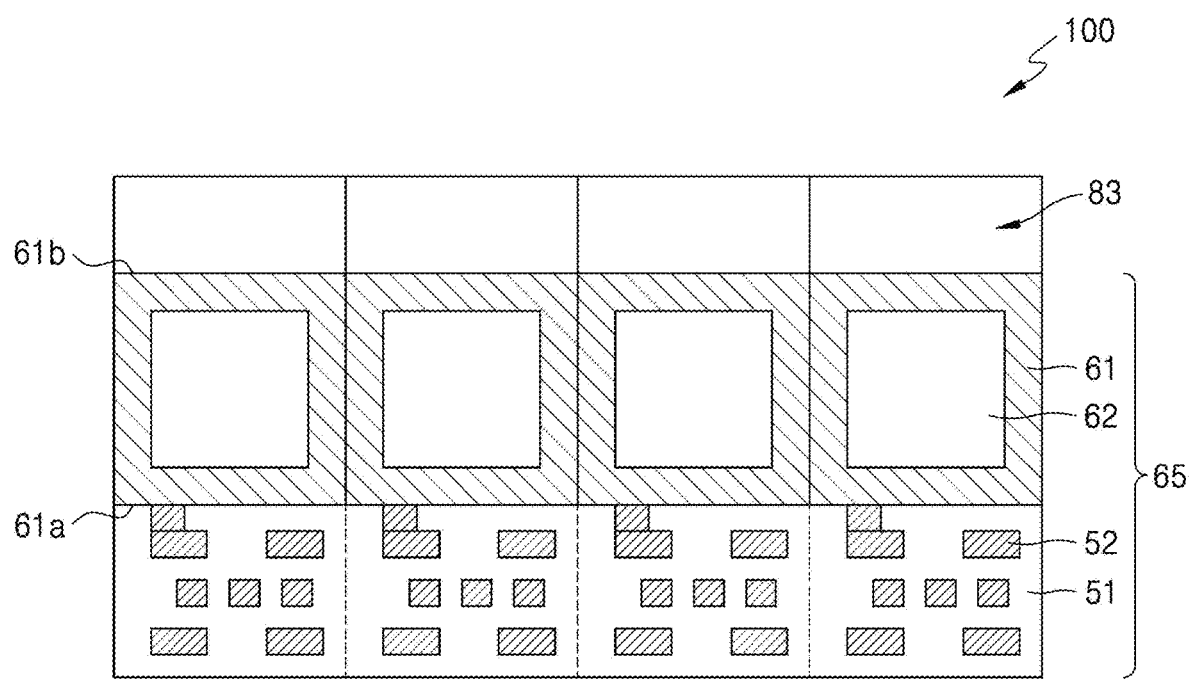
FIG. 1 is a diagram schematically illustrating a cross section of a multispectral image sensor (MIS) according to an embodiment.

Reference will now be made in detail to embodiments, examples of which are illustrated in the accompanying drawings, wherein like reference numerals refer to like elements throughout. In this regard, example embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, various embodiments of the disclosure are described with reference to the accompanying drawings.

FIG. 1 is a diagram schematically illustrating a cross section of a multispectral image sensor (MIS) 100 according to an embodiment.

The MIS 100 shown in FIG. 1 may include, for example, a complementary metal oxide semiconductor (CMOS) image sensor or a charge coupled device (CCD) image sensor.

The MIS 100 may include a pixel array 65 and a multispectral filter array (MSFA) 83 provided on the pixel array. Here, the pixel array 65 may include a plurality of pixels arranged two-dimensionally, and the MSFA 83 may include a plurality of resonators corresponding to the plurality of pixels. FIG. 1 shows an example case where the pixel array 65 includes four pixels and the MSFA 83 contains four resonators.

Each pixel of the pixel array 65 may include a photodiode 62 which is a photoelectric conversion element, and a driving circuit 52 to drive the photodiode 62. The photodiode 62 may be provided to be embedded in a semiconductor substrate 61. For example, a silicon substrate may be used as the semiconductor substrate 61. However, the embodiments are not limited thereto. A wiring layer 51 may be provided on the bottom surface 61a of the semiconductor substrate 61, and the driving circuit 52 such as, for example, a metal-oxide-semiconductor field-effect transistor (MOSFET) may be provided inside the wiring layer 51.

The MSFA 83 including a plurality of resonators is provided on the top surface 61b of the semiconductor substrate 61. Each resonator may be provided to transmit light in a desired specific wavelength band. Each resonator may include reflective layers spaced apart from each other and a cavity provided between the reflective layers. Each of the reflective layers may include, for example, a metal reflective layer or a Bragg reflective layer. Each cavity may be provided to resonate light in a desired specific wavelength band.

The MSFA 83 may include one or more functional layers that improve the transmittance of light incident toward the photodiode 62 through the MSFA 83. The functional layer may include a dielectric layer or a dielectric pattern having a controlled refractive index. In addition, the functional layer may include, for example, an antireflection layer, a focusing lens, a color filter, a short wavelength absorption filter, a long wavelength blocking filter, or the like. However, this is merely illustrative.

Figure 2A:
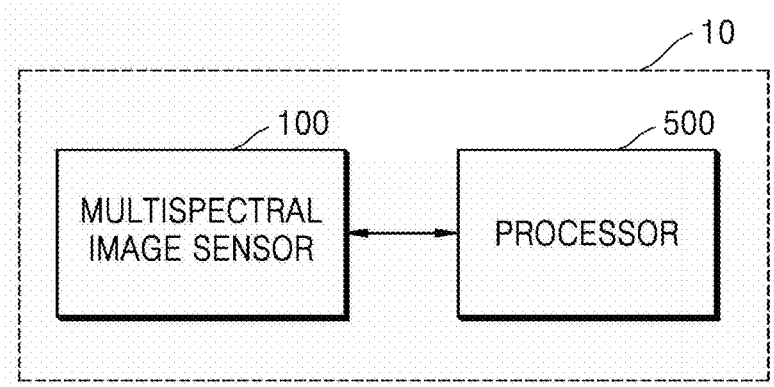
FIGS. 2A and 2B are block diagrams illustrating an image acquisition device according to embodiments.
Figure 2B:
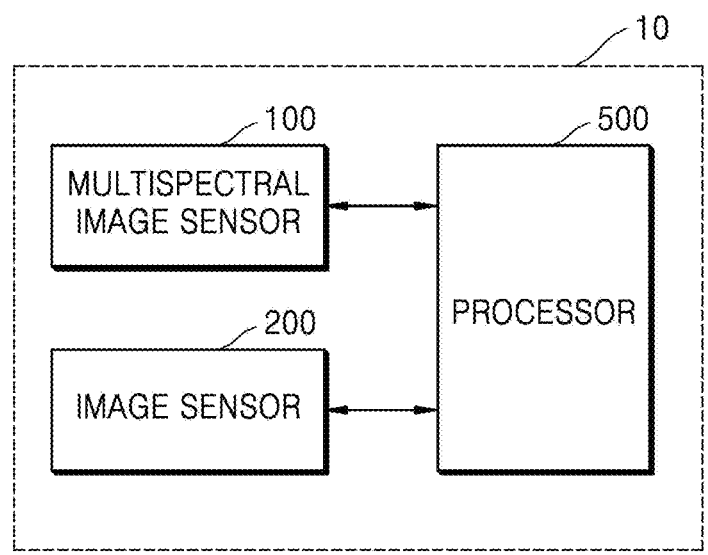

FIGS. 2A and 2B are block diagrams illustrating an image acquisition device 10 according to embodiments.

Referring to FIG. 2A, the image acquisition device 10 according to an embodiment includes an MIS 100 and a processor 500.

The MIS 100 may include a filter capable of transmitting light for each band in each channel. The MSFA may represent filters corresponding to the entire band sensed by the MIS 100. The MSFA may have a one-dimensional or two-dimensional arrangement. For example, when the number of channels is 16, the MSFA may be a 4×4 array.

The filter of each channel may transmit light in a specific band. To this end, the filter may have a resonance structure. The transmission band of the filter may be determined according to a resonance structure. For example, the transmission band may be adjusted according to the material constituting a reflective layer, the material constituting a cavity, and the thickness of the cavity. The filter may be implemented by grating, nanostructure, distributed Bragg reflector (DBR), or other methods.

The MIS 100 may acquire images of at least four channels based on a wavelength band of 10 nm to 1000 nm. In addition, the MIS 100 may generate images of 16 channels within a wavelength range of 10 nm to 1000 nm, or may generate images of 31 channels by interpolating images of 16 channels. However, the number of channels that the MIS 100 may acquire or generate is not limited to 4, 16, or 31.

The processor 500 generates a demosaiced multispectral image from the raw multispectral image acquired from the MIS 100 by performing color interpolation.

In some embodiments, the processor 500 generates a guide image for color interpolation, and generates a difference image between the raw multispectral image and the guide image. In addition, the processor 500 generates a demosaiced difference image by performing color interpolation based on the difference image, and generates a demosaiced multispectral image based on the demosaiced difference image and the guide image.

In some embodiments, the processor 500 generates a demosaiced multispectral image by performing color interpolation based on the raw multispectral image instead of the difference image.

Referring to FIG. 2B, the image acquisition device 10 according to an embodiment includes an MIS 100, an image sensor 200, and a processor 500. The image sensor 200 acquires a first image in a first wavelength band. The MIS 100 acquires a second image in a second wavelength band. The second wavelength band may include the first wavelength band and may be wider than the first wavelength band.

The image sensor 200 may have a smaller number of channels than that of the MIS 100. Accordingly, the color information of the channels of the image sensor 200 may have a higher spectral correlation and a higher spatial correlation than those of the MIS 100.

In some embodiments, the image sensor 200 may be an RGB image sensor. The RGB image sensor has an R channel, a G channel, and a B channel. The image sensor 200 is a sensor employed in a general RGB camera and may be a CMOS image sensor using a Bayer filter array. The first image acquired by the image sensor 200 may be an RGB image based on red, green, and blue light.

In some embodiments, the image sensor 200 may be a monochrome image sensor. The monochrome image sensor has one color channel. The first image acquired by the image sensor 200 may be a monochrome image.

The MIS 100 may be a sensor that senses light of a wider wavelength band than that of the image sensor 200. Each channel of the MIS 100 may adjust a band, a transmission amount, and a bandwidth through which light is transmitted to sense light in a desired band. The bandwidth of each channel of the MIS 100 may be set narrower than the R, G, and B bands. The total bandwidth sum of the bandwidths of all channels of the MIS 100 includes the RGB bandwidth. In other words, the total bandwidth sum of all bandwidths in the MIS may be wider than the visible light bandwidth. For example, the MIS 100 may have a bandwidth of 10 nm to 1000 nm. The second image acquired by the MIS 100 may be a multispectral image or hyperspectral image. In addition, the second image may be a wavelength-based image which includes a wavelength band wider than an RGB wavelength band. for example, a visible light band. The second image may be obtained by dividing an ultraviolet to infrared wavelength band, which is a wider wavelength band than the visible light band, into 16 or more channels. The second image may be an image acquired by using all the available numbers of channels of the MIS 100, or may be an image acquired by selecting specific channels. The first image may have a higher spatial resolution than the second image.

Although not shown in FIG. 2B, the image acquisition device 10 may further include a memory. The memory may store various types of data processed in the image acquisition device 10. For example, the memory may store an image acquired from the MIS 100. The memory may be a line memory sequentially storing an image in a line unit, or may be a frame buffer storing the entire image. In addition, the memory may store applications and drivers to be driven by the image acquisition device 10. The memory may include random access memory (RAM) such as dynamic random access memory (DRAM), static random access memory (SRAM), etc., read-only memory (ROM), electrically erasable programmable read-only memory (EE-PROM), CD-ROM, Blu-ray or other optical disk storage, hard disk drive (HDD), solid state drive (SSD), or flash memory. However, the embodiments are not limited thereto.

The memory may be located outside the MIS 100 or may be integrated inside the MIS 100. When the memory is integrated inside the MIS 100, the memory may be integrated with a circuit unit (e.g., the wiring layer 51 and/or the driving circuit 52 described with reference to FIG. 1). A pixel unit (for example, the semiconductor substrate 61 and/or the photodiode 62 described with reference to FIG. 1) and the other portion (e.g., a circuit unit and a memory) may be stacked in one stack, respectively, and integrated into a total of two stacks. In this case, the MIS 100 may be implemented into one chip including two stacks. However, the embodiments are not limited thereto, and the MIS 100 may be implemented in three stacks having three layers of a pixel unit, a circuit unit, and a memory.

The processor 500 may perform basic image processing before or after the image acquired by the MIS 100 is stored in the memory. The basic image processing may include bad pixel correction, fixed pattern noise correction, crosstalk reduction, remosaicing, demosaicing, false color reduction, denoising, chromatic aberration correction, and the like.

Figure 3B:
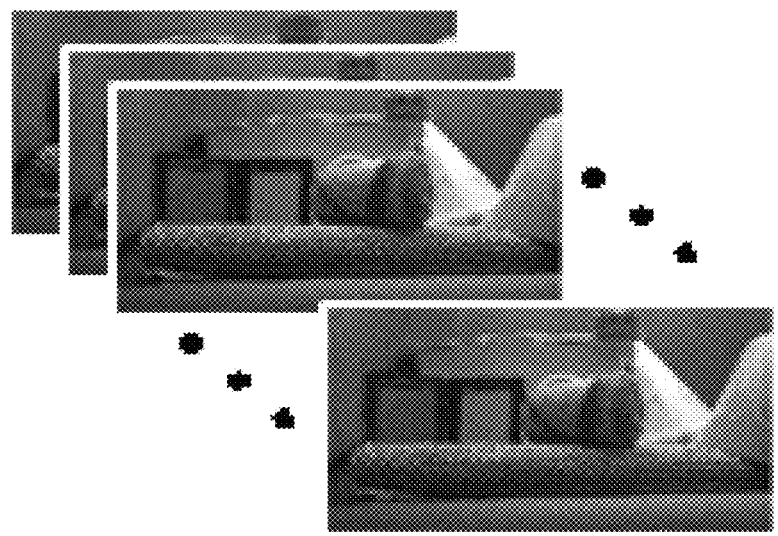
FIG. 3B shows an image obtained by an MIS according to embodiments.

FIGS. 3A and 3B respectively show an arrangement of channels of image data of a raw multispectral image obtained by the MIS and an image after demosaicing. In FIG. 3A, one small square represents one pixel. The number in the square represents the channel number. As shown in FIG. 3A, pixels corresponding to different channels, for example, 16 channels, are mixed in the raw multispectral image. The processor 500 may generate an image of each channel as shown in FIG. 3B by collecting pixels of the same channel through a demosaicing process.

Figure 4:
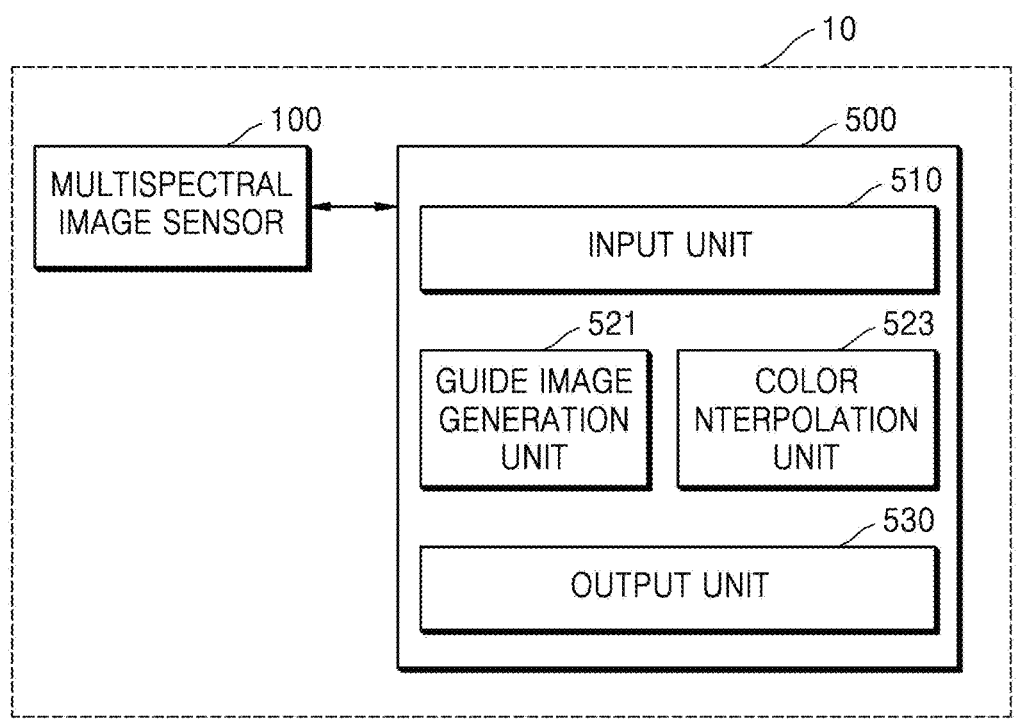
FIG. 4 is a block diagram illustrating an image acquisition device according to an embodiment.

FIG. 4 is a block diagram illustrating an image acquisition device 10 according to an embodiment.

According to an embodiment, a processor 500 includes an input unit 510, a guide image generation unit 521, a color interpolation unit 523, and an output unit 530. For convenience of description, the input unit 510, the guide image generation unit 521, the color interpolation unit 523, and the output unit 530 are discriminated according to the operation of the processor 500, but the discrimination does not necessarily mean that the units are physically separated. The units may correspond to any combination of hardware and/or software, and may be physically the same or different from each other.

The input unit 510 transmits the raw multispectral image to the guide image generation unit 521 and the color interpolation unit 523. The raw multispectral image may be a part or the whole of the image captured by the MIS 100. Alternatively, the raw multispectral image may be an image in which an image captured by the MIS 100 is scaled. Alternatively, the raw multispectral image may be an image in which an image captured by the MIS 100 has undergone other transformations.

The guide image generation unit 521 generates a guide image and weight data. The guide image may be an image having a higher spatial resolution than the raw multispectral image. The guide image generation unit 521 may generate a guide image and weight data from the raw multispectral image. Alternatively, the guide image generation unit 521 may generate a guide image and weight data from an RGB color image or a monochrome image.

The color interpolation unit 523 generates a demosaiced multispectral image by performing color interpolation. The color interpolation unit 523 may generate a difference image between the raw multispectral image and the guide image. The color interpolation unit 523 may generate a demosaiced multispectral image by performing color interpolation based on the difference image using a binary search method. Alternatively, the color interpolation unit 523 may generate a demosaiced multispectral image by performing color interpolation based on the raw multispectral image using a binary search method.

The output unit 530 outputs the demosaiced multispectral image. The output unit 530 may output the demosaiced multispectral image to a memory or an external device of the image acquisition device 10. The output unit 530 may output an image to the line memory in units of lines or output the entire image to the frame buffer.

The demosaiced multispectral image has a higher spatial resolution compared to the raw multispectral image. For example, in the case of a MSFA with a 4×4 array, when the raw multispectral image has a spatial resolution of h×v, the demosaiced multispectral image may have a spatial resolution of 4h×4v. The output unit 530 may change the spatial resolution of the demosaiced multispectral image through upsampling or downsampling. For example, the output unit 530 may output a demosaiced multispectral image with a spatial resolution greater than 4h×4v by upsampling, or a demosaiced multispectral image with a spatial resolution less than 4h×4v by downsampling.

Figure 5:
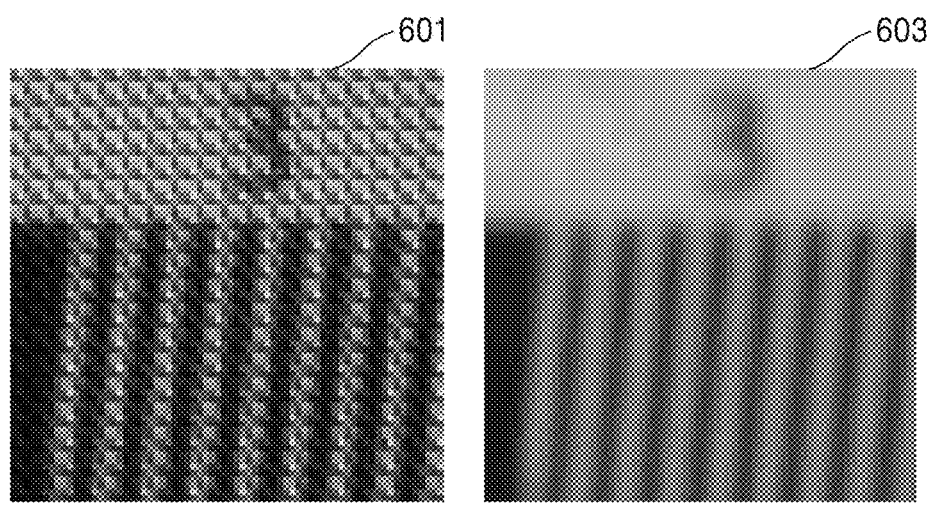
FIG. 5 illustrates diagrams for explaining a low-frequency multispectral image according to an embodiment.
Figure 6:
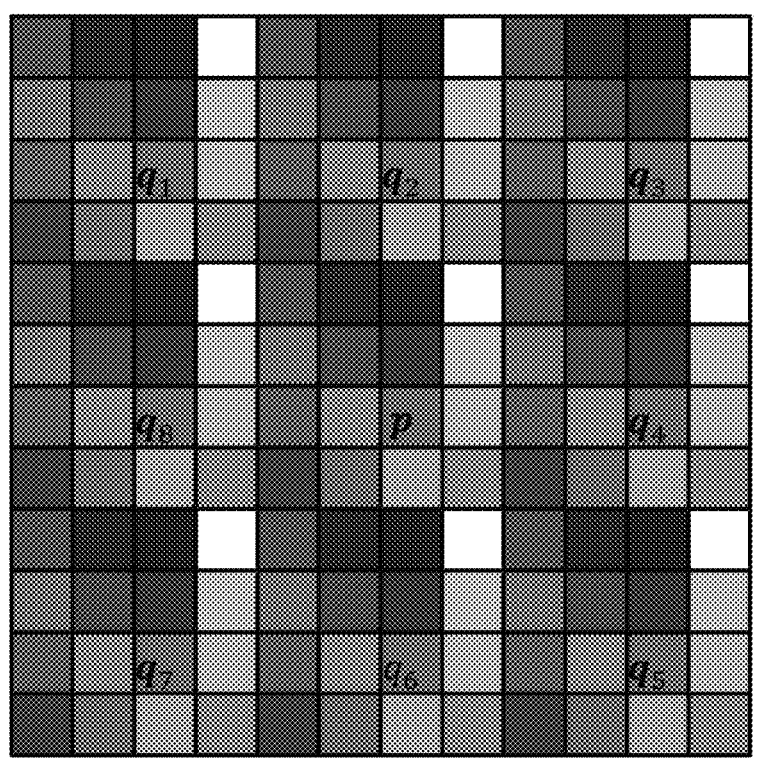
FIG. 6 illustrates a diagram for explaining a high-frequency multispectral image according to an embodiment.

FIG. 5 illustrates diagrams for explaining a low-frequency multispectral image according to an embodiment. FIG. 6 illustrates a diagram for explaining a high-frequency multispectral image according to an embodiment.

Color interpolation is a process of searching for true multispectral images from raw multispectral images. The raw multispectral image may be expressed as Equation 1.

$$I^{MSFA} = \sum_{ch=1}^{N} I_{ch}(i,j) m_{ch}(i,j) \qquad \text{[Equation 1]}$$

In Equation 1, $I_{ch}$ represents a true multispectral image of channel ch, $m_{ch}$ represents a binary mask of channel ch, N represents the number of channels of a MSFA, and $I^{MSFA}$ represents a raw multispectral image.

In order to perform color interpolation close to the true multispectral image, it is necessary to complete colors by using correlations between channels. At the same time, it is necessary to prevent loss of edge information of the raw multispectral image during color interpolation.

$$I^{PPI} = \frac{1}{N}\sum_{ch=1}^{N} I_{ch}(i,j) \qquad \text{[Equation 2]}$$

In Equation 2, $I^{PPI}$ represents a pseudo panchromatic image (PPI).

Since the PPI of Equation 2 includes average information of the entire channel, the PPI of Equation 2 has a high correlation between channels. In addition, the PPI includes edge information of the true multispectral image. Therefore, if a guide image is a PPI, color interpolation results close to the true multispectral image may be expected in color interpolation using the difference image between the raw multispectral image and the guide image.

The PPI of Equation 2 may be derived when a true multispectral image is given. Meanwhile, the data that the processor 500 receives from the MIS 100 is a raw multispectral image. Accordingly, the guide image generation unit 521 may be configured to generate a guide image from a given raw multispectral image.

Referring to FIG. 5, the guide image generation unit 521 generates a low-frequency multispectral image 603 by filtering the raw multispectral image 601 by using a low-pass filter (LPF).

$$\bar{I}^M = I^{MSFA} * M \qquad \text{[Equation 3]}$$

In Equation 3, $\bar{I}^M$ represents a low-frequency multispectral image, M represents a LPF, and symbol * represents a convolution operator.

The LPF may have an arrangement having a larger size than the MSFA. For example, the MSFA may include a 4×4 array, and the LPF may include a 5×5 array. Equation 4 is an example of the LPF.

$$M = \begin{bmatrix} 1 & 2 & 2 & 2 & 1 \\ 2 & 4 & 4 & 4 & 2 \\ 2 & 4 & 4 & 4 & 2 \\ 2 & 4 & 4 & 4 & 2 \\ 1 & 2 & 2 & 2 & 2 \end{bmatrix} /64 \qquad \text{[Equation 4]}$$

The guide image generation unit 521 generates a high-frequency multispectral image based on the difference between the raw multispectral image and the low-frequency multispectral image. Referring to FIG. 6, in one embodiment, the guide image generation unit 521 may generate a high-frequency multispectral image based on Equation 5 for a MSFA having 16 channels in a 4×4 array.

$$\left(I_p^{MSFA} - \frac{\sum_{k=1}^{8} w_k I_{q_k}^{MSFA}}{\sum_{k=1}^{8} w_k}\right) - \left(\bar{I}_p^M - \frac{\sum_{k=1}^{8} w_k \bar{I}_{q_k}^M}{\sum_{k=1}^{8} w_k}\right) \qquad \text{[Equation 5]}$$

In Equation 5, $I_p^{MSFA}$ represents a value of pixel p of a raw multispectral image, $I_{q_k}^{MSFA}$ represents a value of pixel $q_k$ of a raw multispectral image, $\bar{I}_p^M$ represents a value of pixel p of a low-frequency multispectral image, and $\bar{I}_{q_k}^M$ represents a value of pixel $q_k$ of a low-frequency multispectral image. In Equation 5, a weight w may be determined based on a gradient between the pixel p and the pixel q, but is not limited thereto.

The guide image generation unit 521 generates a guide image by adding a low-frequency multispectral image and a high-frequency multispectral image. In an embodiment, the guide image generation unit 521 may generate a guide image based on Equation 6.

$$\hat{I}_p = \bar{I}_p^M + \left(I_p^{MSFA} - \frac{\sum_{k=1}^{8} w_k I_{q_k}^{MSFA}}{\sum_{k=1}^{8} w_k}\right) - \left(\bar{I}_p^M - \frac{\sum_{k=1}^{8} w_k \bar{I}_{q_k}^M}{\sum_{k=1}^{8} w_k}\right) \qquad \text{[Equation 6]}$$

In Equation 6, $\hat{I}_p$ represents a guide image.

The guide image generated by the guide image generation unit 521 has a high correlation between channels as generated based on the low-frequency multispectral image. In addition, the guide image generated by the guide image generation unit 521 includes edge information as generated based on the high-frequency multispectral image. Accordingly, the PPI may be estimated from the guide image generated by the guide image generation unit 521. In addition, in color interpolation using the difference image between the raw multispectral image and the guide image, color interpolation results close to the true multispectral image may be expected.

Figure 7:
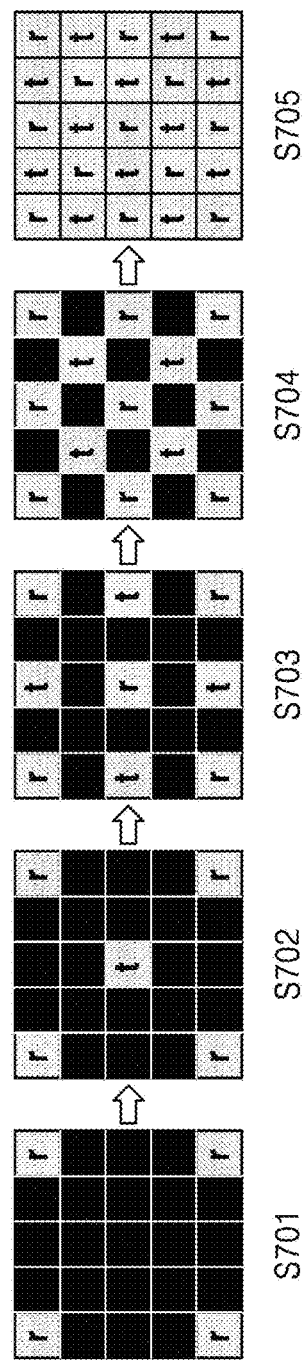
FIG. 7 illustrates diagrams illustrating a binary search method according to an embodiment.

FIG. 7 illustrates diagrams illustrating a binary search method according to an embodiment.

A binary search method is described based on an image obtained from a MSFA having 16 channels in a 4×4 array. In the image, a specific channel is repeated every 4 rows and every 4 columns.

In operation S701 of the binary search method, reference pixels r corresponding to the reference color channel are set. The reference color channel may be any one of 16 channels. In this case, since the reference color channel is repeated every four rows and every four columns, the reference pixels r are repeated every four pixels in the column direction and the row direction.

In operation S702 of the binary search method, target pixels t located at the same distance from the reference pixels r are found. Target pixels t located at the same distance from two or more adjacent reference pixels r may be found. In an embodiment with reference to FIG. 7, target pixels t located at the same distance from four adjacent reference pixels r are found. The found target pixels t are included among the reference pixels.

Likewise, in operations S703, S704, and S705 of the binary search method, target pixels t located at the same distance from the reference pixels r are found. The found target pixels t are included among the reference pixels.

Since all pixels are found in operation S705, the binary search method is terminated. In other words, since all pixels are included among the reference pixels, the binary search method ends.

Referring to FIG. 7, a binary search method for a MSFA having 16 channels in a 4×4 array according to an embodiment has been described. Since the binary search method does not depend on the number of channels or channel arrangement of a MSFA, the binary search methods according to various embodiments may be applied to MSFAs of various sizes and channel arrangements.

Figure 8:
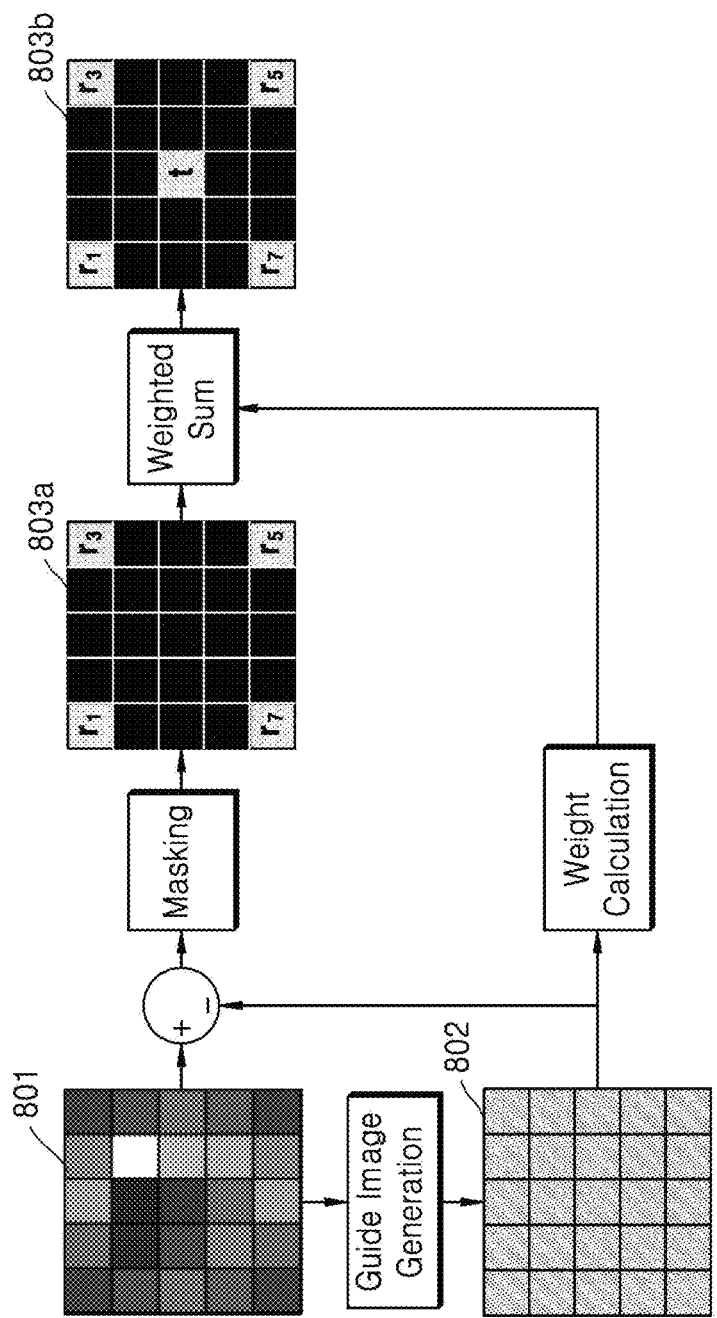
FIG. 8 is a conceptual circuitry diagram illustrating a color interpolation method using a guide image according to an embodiment.

FIG. 8 is a conceptual circuitry diagram illustrating a color interpolation method using a guide image 802 according to an embodiment.

A color interpolation method for a reference color channel is described based on a raw multispectral image 801 acquired from a MSFA having 16 channels of a 4×4 array.

The guide image generation unit 521 generates the guide image 802 using the raw multispectral image 801. The description with reference to FIGS. 5 and 6 may be used to describe generation of the guide image 802.

The color interpolation unit 523 may generate a difference image between the raw multispectral image 801 and the guide image 802. The color interpolation unit 523 may set a demosaiced difference image 803a by masking pixels not corresponding to the reference color channel in the difference image. A binary mask may be used for masking. Alternatively, the color interpolation unit 523 may set a demosaiced difference image 803a by sampling pixels corresponding to the reference color channel in the difference image. Accordingly, the reference pixels of the demosaiced difference image 803a may be set to pixels corresponding to the reference color channel of the raw multispectral image 801.

The color interpolation unit 523 may select target pixels to perform color interpolation on the demosaiced difference image 803a. The color interpolation unit 523 may select target pixels based on the binary search method. In an embodiment with reference to FIG. 8, the color interpolation unit 523 selects a target pixel t located at the same distance from four adjacent reference pixels $r_1$, $r_3$, $r_5$, and $r_7$. As an alternate to FIG. 8, the color interpolation unit 523 may select a target pixel located at the same distance from two adjacent reference pixels (e.g., either $(r_1, r_3)$, $(r_1, r_5)$, or $(r_1, r_7)$).

The guide image generation unit 521 generates weight data for reference pixels. The guide image generation unit 521 may generate weight data from values of pixels of the guide image 802 corresponding to the reference pixels and values of pixels of the guide image 802 corresponding to the target pixels. The guide image generation unit 521 may generate weight data from gradients between pixels of the guide image 802 corresponding to the reference pixels and pixels of the guide image 802 corresponding to the target pixels. In an embodiment with reference to FIG. 8, the guide image generation unit 521 may generate weight data based on Equation 7.

$$w_1 = (1 + |\hat{I}(i,j) - \hat{I}(i-2, j-2)|)^{-1},$$ [Equation 7]

$$w_3 = (1 + |\hat{I}(i,j) - \hat{I}(i-2, j+2)|)^{-1},$$

$$w_5 = (1 + |\hat{I}(i,j) - \hat{I}(i+2, j+2)|)^{-1},$$

$$w_7 = (1 + |\hat{I}(i,j) - \hat{I}(i+2, j-2)|)^{-1}.$$

In Equation 7, $\hat{I}(i,j)$ represents a value of a pixel of the guide image 802 corresponding to a target pixel t, $\hat{I}(i\pm2, j\pm2)$ represents values of pixels of the guide image 802 corresponding to the reference pixels $r_1$, $r_3$, $r_5$, and $r_7$, $w_1$ represents a weight based on a gradient between a pixel of the guide image 802 corresponding to the target pixel t and a pixel of the guide image 802 corresponding to the reference pixel $r_1$, $w_3$ represents a weight based on a gradient between a pixel of the guide image 802 corresponding to the target pixel t and a pixel of the guide image 802 corresponding to the reference pixel $r_3$, $w_5$ represents a weight based on a gradient between a pixel of the guide image 802 corresponding to the target pixel t and a pixel of the guide image 802 corresponding to the reference pixel $r_5$, and $w_7$ represents a weight based on a gradient between a pixel of the guide image 802 corresponding to the target pixel t and a pixel of the guide 802 corresponding to the reference pixel $r_7$. In Equation 7, number 1 may be replaced by any constant for preventing the denominator from becoming 0.

Since the reference pixels $r_1$, $r_3$, $r_5$, and $r_7$ are uniformly arranged and the distance between the target pixel t and each of the reference pixels $r_1$, $r_3$, $r_5$, and $r_7$ is the same, the weight data calculated from Equation 7 may be offset from the influence due to the distance between the target pixel t and each reference pixel $r_1$, $r_3$, $r_5$, and $r_7$.

The color interpolation unit 523 generates values of target pixels based on weight data and values of reference pixels. The color interpolation unit 523 may generate values of the target pixels from the weighted sum of values of the reference pixels based on the weight data. In an embodiment with reference to FIG. 8, the color interpolation unit 523 may generate a value of the target pixel t by Equation 8.

$$\Delta_{ch}(i,j) = \frac{w_1\Delta_{ch}(i-2, j-2) + w_3\Delta_{ch}(i-2, j+2) + w_5\Delta_{ch}(i+2, j+2) + w_7\Delta_{ch}(i+2, j-2)}{w_1 + w_3 + w_5 + w_7}$$ [Equation 8]

In Equation 8, $\Delta_{ch}(i\pm2, j\pm2)$ represents values of the reference pixels $r_1$, $r_3$, $r_5$, and $r_7$, and $\Delta_{ch}(i,j)$ represents a value of the target pixel t.

The color interpolation unit 523 may generate values of the target pixels and then include the target pixels among the reference pixels. Accordingly, the demosaiced difference image 803a may be updated into the demosaiced difference image 803b.

Figure 9:
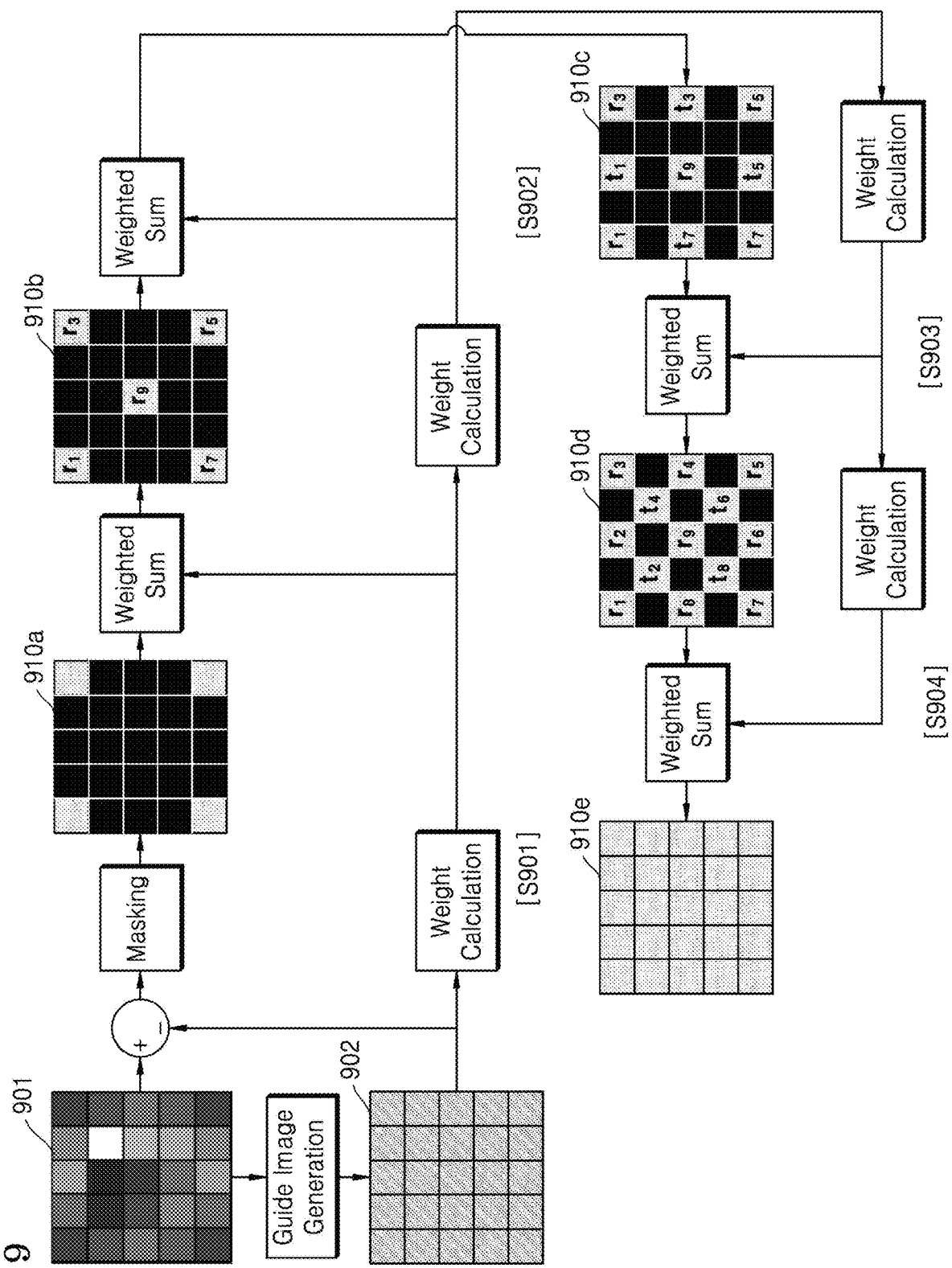
FIG. 9 is a conceptual circuitry diagram illustrating a color interpolation method using a binary search method according to an embodiment.

FIG. 9 is a conceptual circuitry diagram illustrating a color interpolation method using a binary search method according to an embodiment.

A color interpolation method using a binary search method is described based on a raw multispectral image 901 acquired from a MSFA having 16 channels of a 4×4 array.

The description referring to FIG. 8 may be applied to operation S901. Accordingly, the demosaiced difference image 910a may correspond to the demosaiced difference image 803a of FIG. 8, and the demosaiced difference image 910b may correspond to the demosaiced difference image 803b of FIG. 8.

In operation S902, the color interpolation unit 523 selects target pixels to perform color interpolation on the demosaiced difference image 910b. In an embodiment with reference to FIG. 9, the color interpolation unit 523 selects a target pixel $t_7$ located at the same distance from four adjacent reference pixels $r_1$, $r_7$, $r_9$, and unillustrated reference pixel from an adjacent set of channels. The guide image generation unit 521 generates weight data for reference pixels of the demosaiced difference image 910b. The color interpolation unit 523 generates values of the target pixels from the weighted sum of values of the reference pixels based on the weight data. The color interpolation unit 523 has the target pixels included among the reference pixels and updates the demosaiced difference image 910b into the demosaiced difference image 910c. In an embodiment described with reference to FIG. 9, the color interpolation unit 523 has the target pixels $t_1$, $t_3$, $t_5$, and $t_7$ included among the reference pixels.

In operations S903 and S904, the process of operation S902 is repeated according to the binary search method.

In an embodiment described with reference to FIG. 9, the color interpolation unit 523 selects a target pixel $t_2$ located at the same distance from four adjacent reference pixels $r_1$, $r_2$, $r_8$, and $r_9$, in operation S903. In addition, the color interpolation unit 523 makes includes target pixels $t_2$, $t_4$, $t_6$, and $t_8$ among the reference pixels. Accordingly, the demosaiced difference image 910c may be updated into the demosaiced difference image 910d.

In operation S904, as the demosaiced difference image 910d is updated to the demosaiced difference image 910e, the demosaiced difference image 901e is completed.

A plurality of demosaiced difference images may be generated by performing operations S901 to S904 with respect to all channels of the MFSA. The color interpolation unit 523 may generate a demosaiced multispectral image by combining the guide image 902 and a plurality of demosaiced difference images.

Referring to FIG. 9, a color interpolation method for a MSFA having 16 channels in a 4×4 array according to an embodiment has been described. Since the color interpolation method does not depend on the number of channels or channel arrangement of a MSFA, the binary search methods according to various embodiments may be applied to MSFAs of various sizes and channel arrangements.

Figure 10:
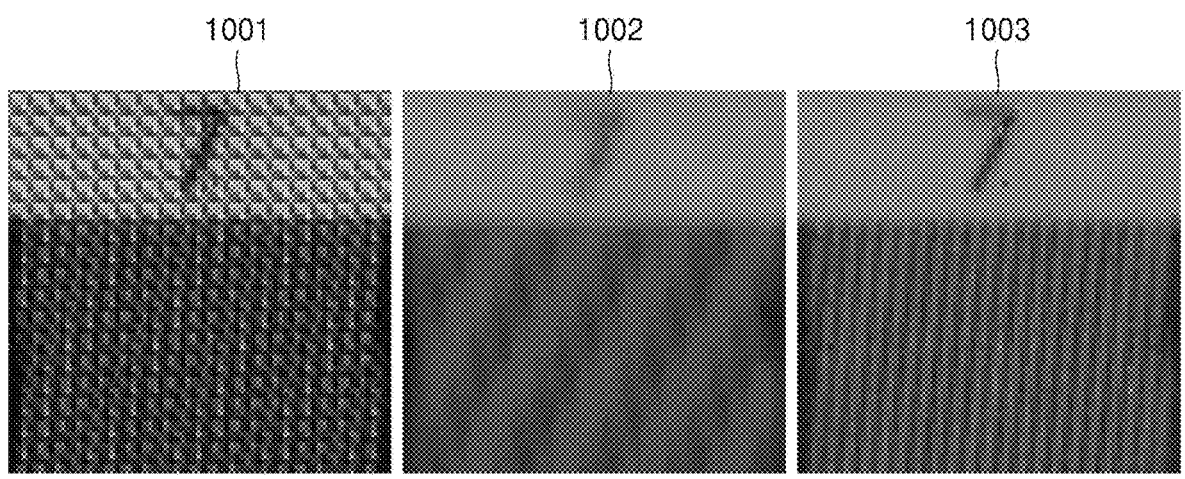
FIG. 10 illustrates diagrams illustrating superiority of a color interpolation method according to an embodiment.

FIG. 10 illustrates diagrams illustrating superiority of a color interpolation method according to an embodiment.

In FIG. 10, an image 1002 generated from a raw multispectral image 1001 using a conventional color interpolation method and a demosaiced multispectral image 1003 generated from the raw multispectral image 1001 using a color interpolation method according to an embodiment of this disclosure are shown. Such image may be displayed on an output monitor.

Compared to the image 1002, it is confirmed that edge information of the raw multispectral image 1001 is preserved in the demosaiced multispectral image 1003. In addition, in terms of artifacts such as spatial resolution degradation and color aliasing, the superiority of the demosaiced multispectral image 1003 relative to the image 1002 is confirmed.

Figure 11:
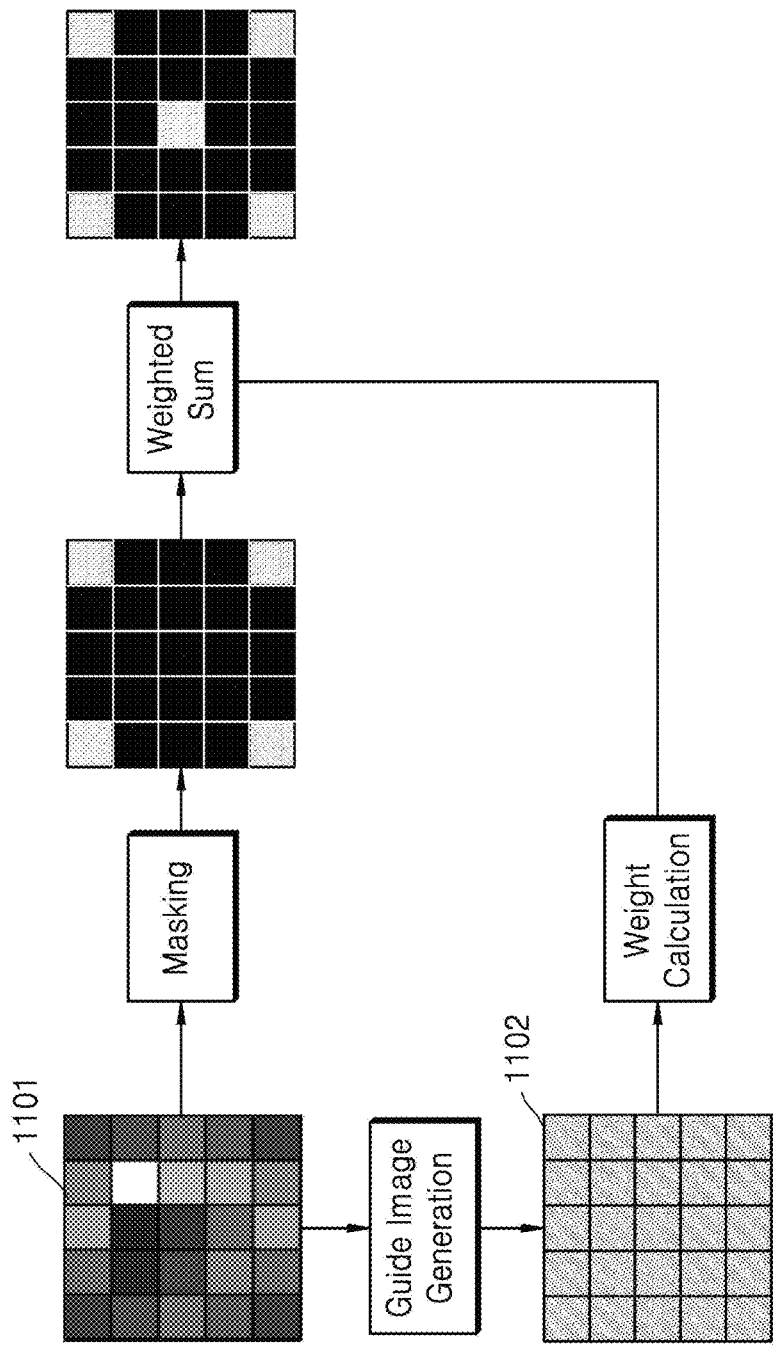
FIG. 11 is a conceptual circuitry diagram illustrating a color interpolation method using a raw multispectral image according to an embodiment.

FIG. 11 is a conceptual circuitry diagram illustrating a color interpolation method using a raw multispectral image according to an embodiment.

Compared to the color interpolation method of the embodiment referring to FIG. 8, a difference image between the raw multispectral image 1101 and the guide image 1102 is not generated in the embodiment of FIG. 11. Accordingly, color interpolation is directly performed on the raw multispectral image 1101. Since a difference image is not generated in the embodiment of FIG. 11, memory usage and overall process time compared to the embodiment of FIG. 8 may be reduced.

Figure 12:
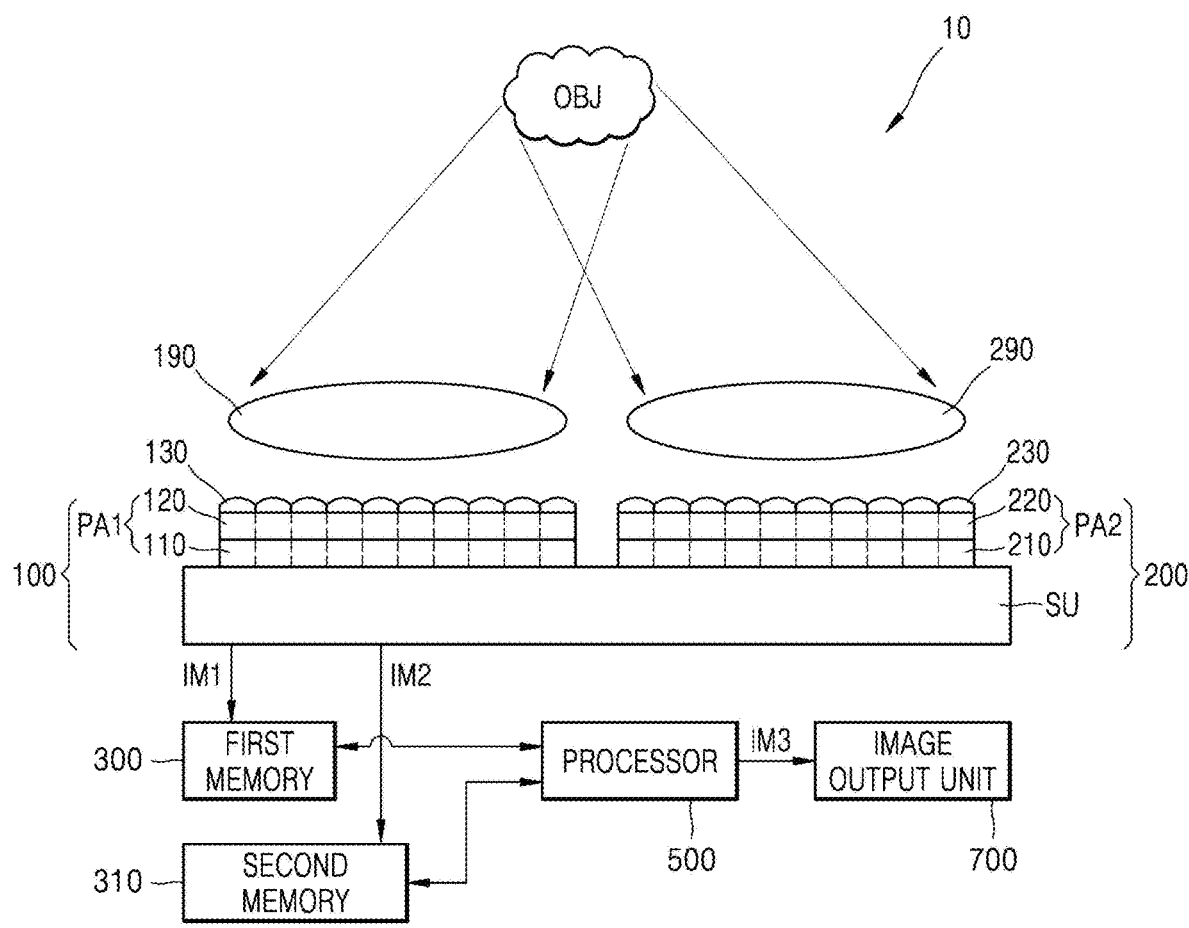
FIG. 12 is a conceptual diagram illustrating a schematic structure of the image acquisition device illustrated in FIG. 2B.
Figure 13:
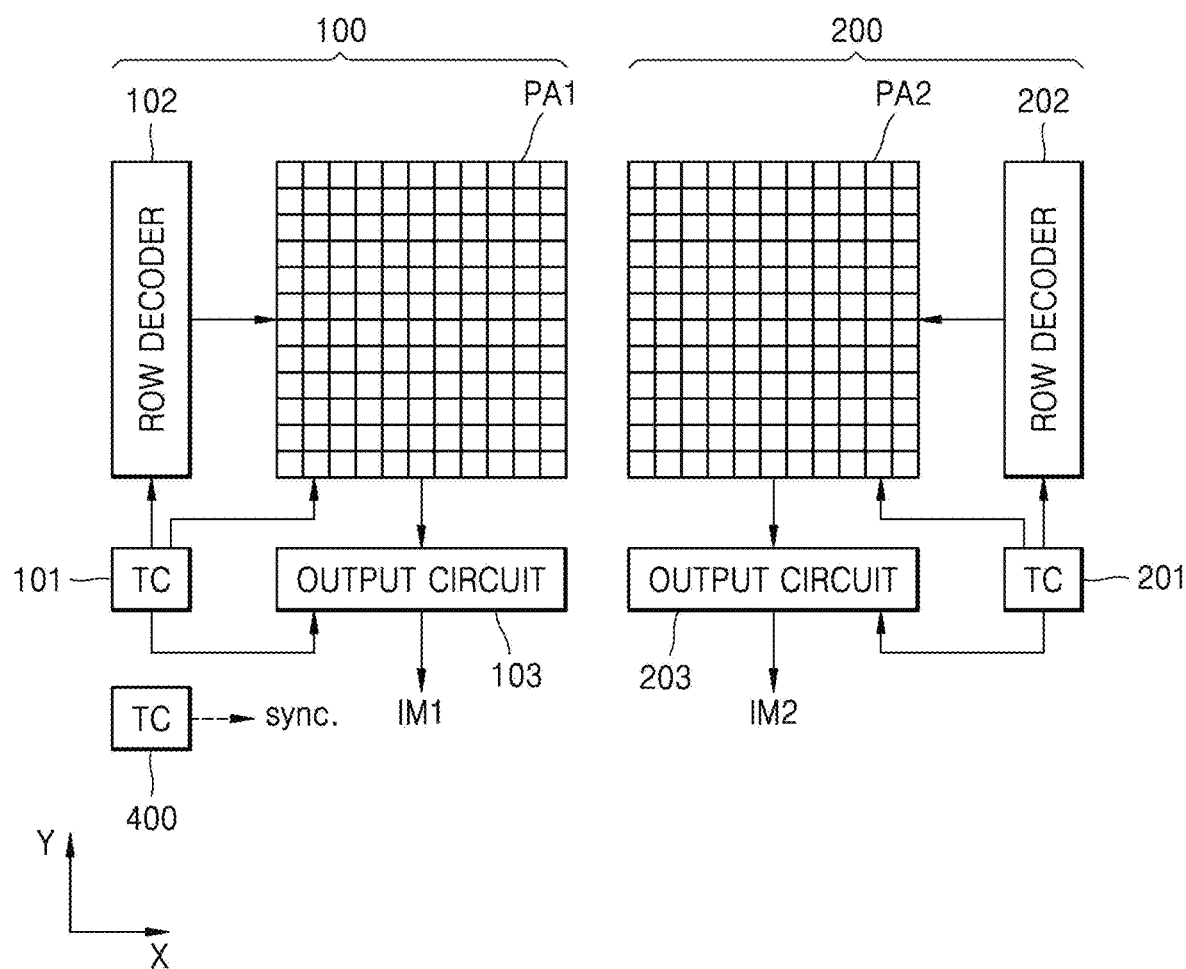
FIG. 13 is a conceptual circuitry diagram illustrating a circuit configuration of an MIS and an image sensor provided in the image acquisition device illustrated in FIG. 2B.

FIGS. 12 and 13 relate to a detailed configuration of the image acquisition device illustrated in FIG. 2B. FIG. 12 is a conceptual diagram illustrating a schematic structure of an image acquisition device according to an embodiment. FIG. 13 is a conceptual diagram illustrating a circuit configuration of an image sensor and an MIS provided in an image acquisition device according to an embodiment.

The image acquisition device 10 includes an MIS 100 that acquires a first image IM1 based on a first wavelength band of 10 nm to 1000 nm, an image sensor 200 that acquires a second image IM2 based on a second wavelength band, and a processor 500 that generates a third image IM3 by signal processing the first image IM1 and second image IM2. The image acquisition device 10 may further include a first memory 300 in which data on the first image IM1 is stored and a second memory 310 in which data on the second image IM2 is stored. In addition, the image acquisition device 10 may further include an image output unit 700 that outputs an image.

The image acquisition device 10 may include a first imaging optical system 190 that forms an optical image of an object OBJ on the MIS 100, and a second imaging optical system 290 that forms an optical image of the object OBJ on the image sensor 200. Each of the first imaging optical system 190 and the second imaging optical system 290 is illustrated as including one lens, but this is an example and is not limited thereto. The first imaging optical system 190 and the second imaging optical system 290 may be configured to have the same viewing angle as the same focal distance, and in this case, a process of matching the first image IM1 and the second image IM2 to form the third image IM3 may be easier. However, the embodiments are not limited thereto.

The MIS 100 includes a first pixel array PA1, and the first pixel array PA1 includes: a first sensor layer 110 having an array of a plurality of first sensing elements; and a spectral filter 120 placed on the first sensor layer 110. The spectral filter 120 may be a MSFA. The spectral filter 120 includes a plurality of filter groups, and each of the plurality of filter groups may include a plurality of unit filters having different transmission wavelength bands. The spectral filter 120 may be configured to filter a wavelength band wider than that of the color filter 220, for example, a wavelength band in the ultraviolet to infrared wavelength range, so as to be subdivided more in comparison to the color filter 220. A first microlens array 130 may be arranged on the first pixel array PA1. An example of a pixel array applied to the first pixel array PA1 will be described later with reference to FIGS. 17 to 19.

The image sensor 200 includes a second pixel array PA2, and the second pixel array PA2 includes: a second sensor layer 210 having an array of a plurality of second sensing elements; and a color filter 220 placed on the second sensor layer 210. The color filter 220 may include red filters, green filters, and blue filters, which are alternately arranged. A first microlens array 230 may be arranged on the second pixel array PA2.

The first sensor layer 110 and the second sensor layer 210 may include a CCD sensor or a CMOS sensor, but are not limited thereto.

The first pixel array PA1 and the second pixel array PA2 may be arranged on the same circuit board SU horizontally, for example, to be spaced apart in the X direction.

The circuit board SU may be provided with first circuit elements for processing signals from the first sensor layer 110 and second circuit elements for processing signals from the second sensor layer 210. However, the embodiments are not limited thereto, and the first circuit elements and the second circuit elements may be provided on separate substrates, respectively.

The first and second memories 300 and 310 in which data for the first image IM1 and the second image IM2 is stored is illustrated separately from the circuit board SU, but this is an example, and may be placed in the circuit board SU in the same layer as the circuit elements or in separate layers. Each of the memories 300 and 310 may be a line memory storing an image in units of lines, or may be a frame buffer storing the entire image. An SRAM or DRAM may be used in each of the memories 300 and 310.

Various circuit elements necessary for the image acquisition device 10 may be integrally arranged on the circuit board SU. For example, a logic layer including various analog circuits and digital circuits may be provided, and a memory layer in which data is stored may be provided. The logic layer and the memory layer may be implemented in different layers or the same layer.

Referring to FIG. 13, a row decoder 102, an output circuit 103, and a timing controller TC 101 are connected to a first pixel array PA1. The row decoder 102 selects one of rows of the first pixel array PA1 in response to a row address signal output from the timing controller 101. The output circuit 103 outputs a light detection signal in units of columns from a plurality of pixels arranged along the selected row. To this end, the output circuit 103 may include a column decoder and an analog-to-digital converter (ADC). For example, the output circuit 103 may include a plurality of analog-to-digital converters (ADCs) arranged for each column between a column decoder and the first pixel array PA1, or one ADC arranged at the output end of the column decoder. The timing controller 101, the row decoder 102, and the output circuit 103 may be implemented as one chip or each separate chip. A processor for processing a first image signal IM1 output through the output circuit 103 may be implemented as one chip together with the timing controller 101, the row decoder 102, and the output circuit 103.

A row decoder 202, an output circuit 203, and a timing controller (TC) 201 are also connected to the second pixel array PA2, and a signal from the second pixel array PA2 may be processed in a similar manner to the case described above. In addition, the processor for processing a second image signal IM2 output through the output circuit 203 may be implemented as one chip together with the timing controller 201, the row decoder 202, and the output circuit 203.

The first pixel array PA1 and the second pixel array PA2 are shown to have the same pixel size and number, but this is a convenience example and is not limited thereto.

Timing control may be required in operating two different types of sensors depending on different resolutions, output speeds, and the size of an area required for image registration. For example, when one image column is read based on the image sensor 200, the image column of the MIS 100 corresponding to the area may already be stored in a buffer or may need to be newly read. Alternatively, operations of the image sensor 200 and the MIS 100 may be synchronized using the same synchronization signal. For example, a timing controller 400 may be further provided to transmit a synchronization signal sync. to the image sensor 200 and the MIS 100.

Figure 14:
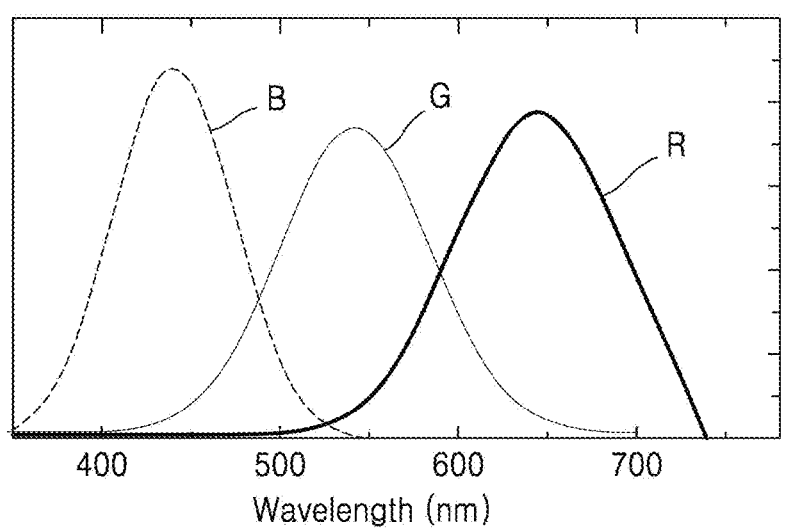
FIG. 14 is a graph illustrating a wavelength spectrum of an RGB sensor.
Figure 15:
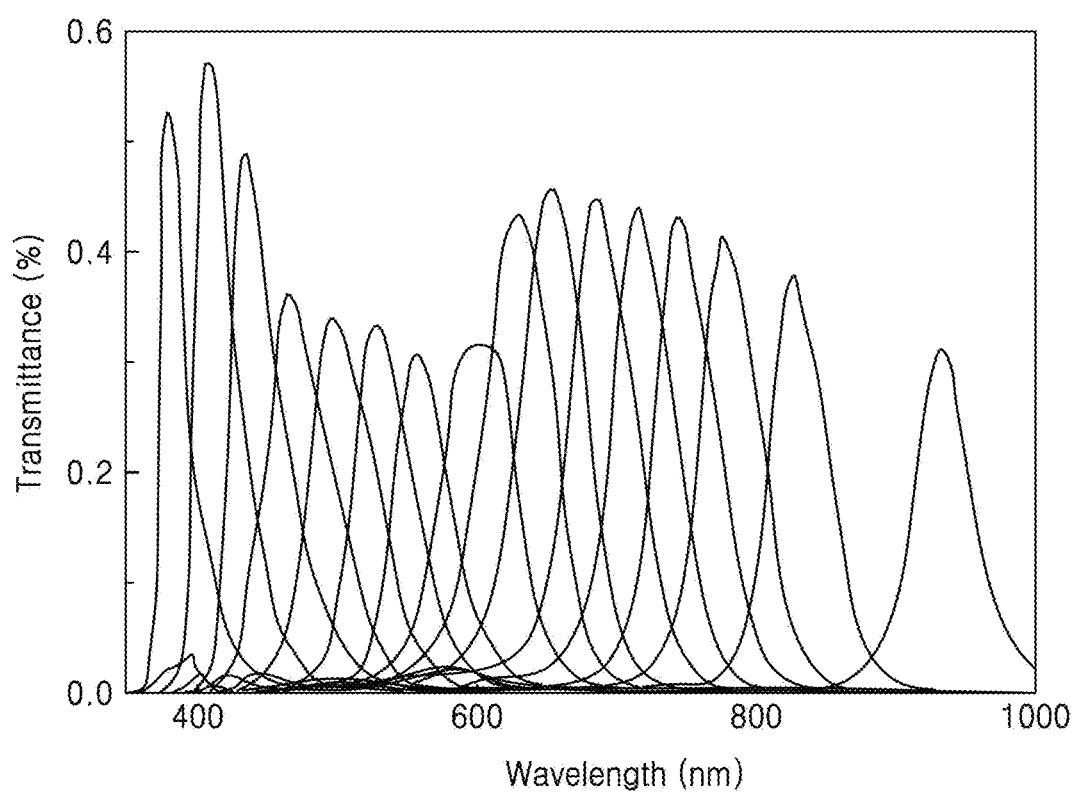
FIGS. 15 and 16 are graphs illustrating a wavelength spectrum of an MIS according to embodiments.
Figure 16:
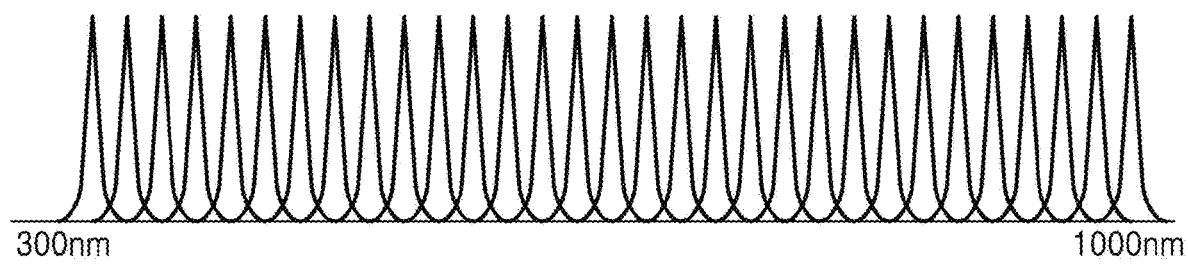

The MIS 100 may be a sensor that senses light in wider wavelength bands than those of the image sensor 200. Referring to FIG. 14, the image sensor 200 includes an R channel, a G channel, and a B channel, and may sense light in a wavelength band corresponding to each of the three channels. As illustrated in FIGS. 15 and 16, the MIS 100 may include 16 channels or 31 channels. However, the embodiments are not limited thereto, and the MIS 100 may include any number of channels as long as it is greater than four.

Figure 17:
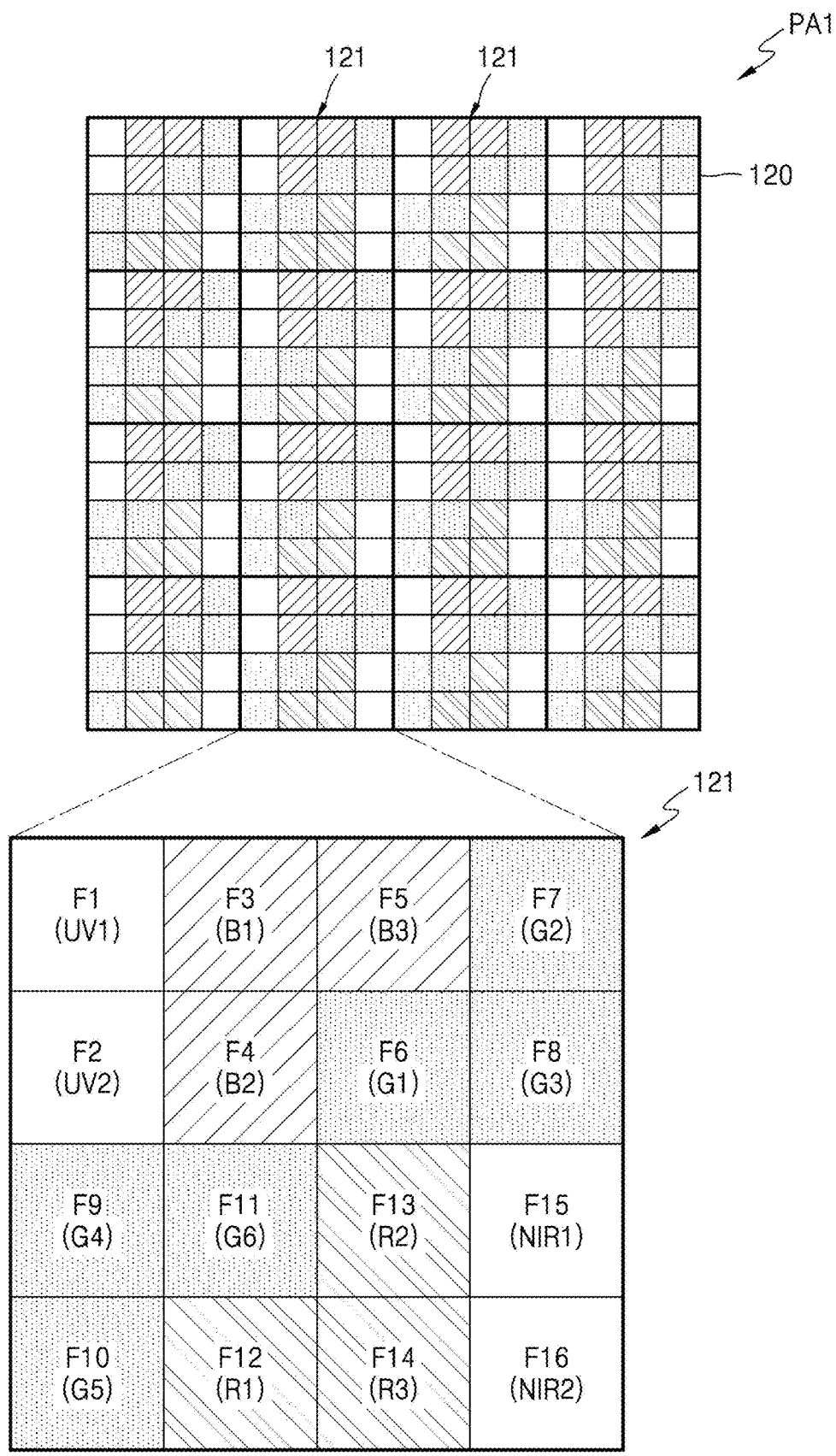
FIGS. 17 to 19 are diagrams illustrating a pixel arrangement of an MIS provided in an image acquisition device according to embodiments.
Figure 18:
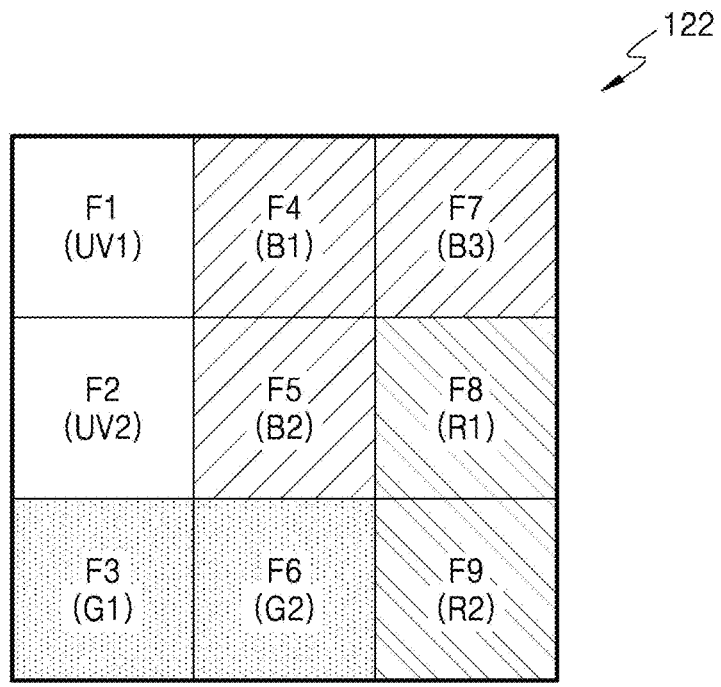
Figure 19:
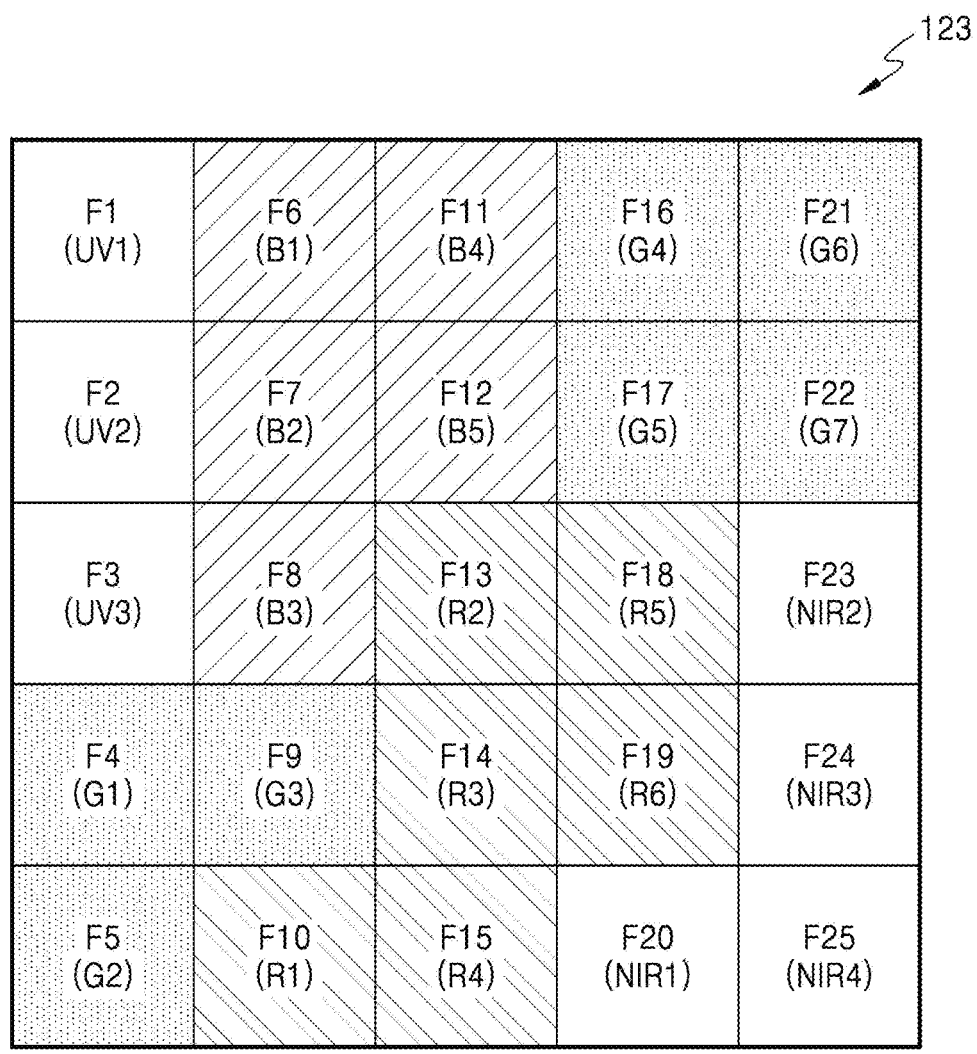

FIGS. 17 to 19 are diagrams illustrating a pixel arrangement of an MIS provided in an image acquisition device according to embodiments.

Referring to FIG. 17, the spectral filter 120 provided in the first pixel array PA1 may include a plurality of filter groups 121 arranged in a two-dimensional form. Here, each of the filter groups 121 may include 16 unit filters F1 to F16 arranged in a 4×4 array.

The first and second unit filters F1 and F2 may have central wavelengths UV1 and UV2 in an ultraviolet region, and the third to fifth unit filters F3 to F5 may have central wavelengths B1 to B3 in a blue light region. The sixth to eleventh unit filters F6 to F11 may have center wavelengths G1 to G6 in a green light region, and the twelfth to fourteenth unit filters F12 to F14 may have center wavelengths R1 to R3 in a red light region. In addition, the fifteenth and sixteenth unit filters F15 and F16 may have central wavelengths NIR1 and NIR2 of the near-infrared band.

FIG. 18 is a plan view illustrating one filter group 122 of another example provided in the spectral filter 120. Referring to FIG. 18, the filter group 122 may include nine unit filters F1 to F9 arranged in a 3×3 array. Here, the first and second unit filters F1 and F2 may have central wavelengths UV1 and UV2 in the ultraviolet region, and the fourth, fifth, and seventh unit filters F4, F5, and F7 may have central wavelengths B1 to B3 in the blue light region. The third and sixth unit filters F3 and F6 may have central wavelengths G1 and G2 in the green light region, and the eighth and ninth unit filters F8 and F9 may have central wavelengths R1 and R2 in the red light region.

FIG. 19 is a plan view illustrating one filter group 123 of another example provided in the spectral filter 120. Referring to FIG. 19, the filter group 123 may include 25 unit filters F1 to F25 arranged in a 5×5 array. Here, the first to third unit filters F1 to F3 may have central wavelengths UV1 to UV3 in the ultraviolet region, and the sixth, seventh, eighth, eleventh, and twelfth unit filters F6, F7, F8, F11, and F12 may have central wavelengths B1 to B5 in the blue light region. The fourth, fifth, and ninth unit filters F4, F5, and F9 may have central wavelengths G1 to G3 in the green light region, and the tenth, thirteenth, fourteenth, fifteenth, eighteenth, and nineteenth unit filters F10, F13, F14, F15, F18, and F19 may have central wavelengths R1 to R6 in the red light region. In addition, the twentieth, twenty-third, twenty-fourth, and twenty-fifth unit filters F20, F23, F24, and F25 may have center wavelengths NIR1 to NIR4 in the near-infrared band.

The unit filters provided in the spectral filter 120 may have a resonance structure having two reflectors, and the transmitted wavelength band may be determined by the characteristics of the resonance structure. The transmission wavelength band may be adjusted according to the material of the reflector, the quality of the dielectric material in the cavity, and the thickness of the cavity. In addition, a structure using grating and a structure using a DBR may be applied to the unit filter.

In addition, pixels of the first pixel array PA1 may be arranged in various ways according to color characteristics of the MIS 100.

Figure 20:
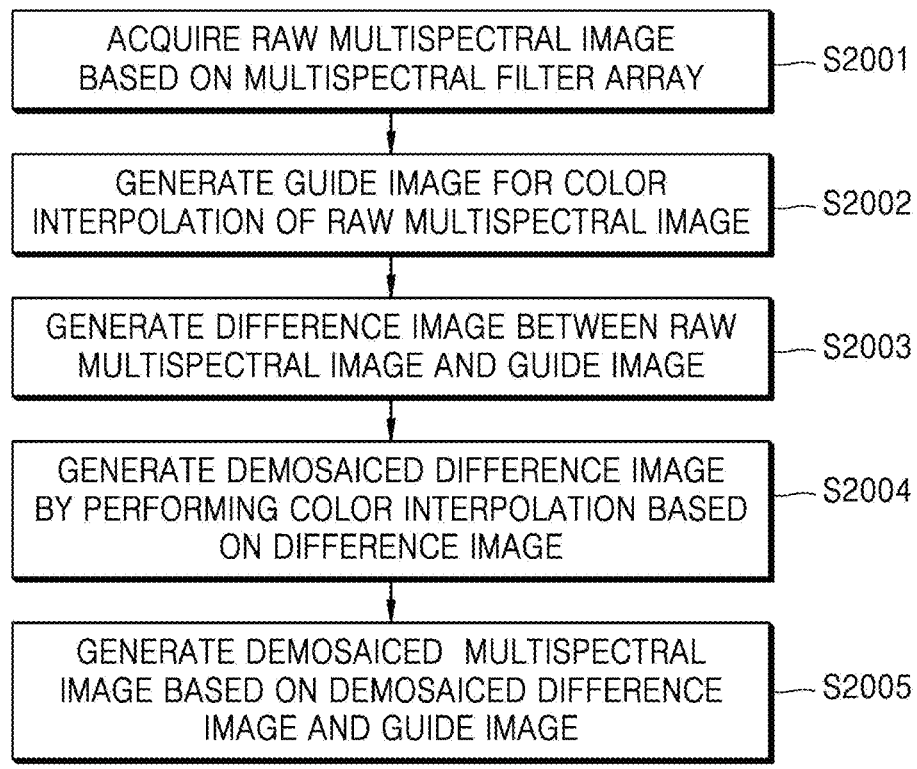
FIGS. 20 and 21 are flowcharts of a color interpolation method for a MSFA according to embodiments.

FIG. 20 is a flowchart of a color interpolation method for a MSFA according to an embodiment.

In operation S2001, the processor 500 acquires a raw multispectral image based on the MSFA. The MSFA may be included in the MIS 100. The MSFA may have four or more color channels. The raw multispectral image may be an image captured by the MIS 100. Alternatively, the raw multispectral image may be an image processed with respect to an image captured by the MIS 100. The processor 500 may receive the raw multispectral image from the MIS 100 or the memory.

In operation S2002, the processor 500 generates a guide image for color interpolation of the raw multispectral image. The guide image may be an image having a higher spatial resolution than the raw multispectral image.

The processor 500 may generate a guide image from the raw multispectral image. The processor 500 may generate a guide image by generating a low-frequency multispectral image and a high-frequency multispectral image from a raw multispectral image, and adding a low-frequency multispectral image and a high-frequency multispectral image.

Alternatively, the processor 500 may generate a guide image from the raw guide image acquired by the image sensor 200. When the image sensor 200 is an RGB color sensor, the raw guide image may be an RGB image. When the image sensor 200 is a monochrome sensor, the raw guide image may be a monochrome image. Accordingly, the raw guide image may have a higher spatial resolution than the raw multispectral image.

The processor 500 may generate a guide image by performing image registration on the raw guide image. Selectively, image calibration may be performed in the process of generating the guide image. As the guide image is generated based on the RGB image or the monochrome image, the guide image may include many high-frequency components. Accordingly, a demosaiced multispectral image having preserved edge components may be generated by performing color interpolation using a guide image based on an RGB image or a monochrome image.

In operation S2003, the processor 500 generates a difference image of the raw multispectral image and the guide image.

In operation S2004, the processor 500 generates a demosaiced difference image by performing color interpolation based on the difference image. The processor 500 may perform color interpolation based on the difference image using the binary search method. In more detail, the processor 500 may perform a first operation of setting reference pixels of the demosaiced difference image from pixels of the difference image corresponding to the reference color channel. In addition, the processor 500 may perform a second operation of selecting target pixels located at the same distance from two or more adjacent reference pixels in the demosaiced difference image. In addition, for each target pixel, the processor 500 may perform a third operation of generating a pixel value of the target pixel based on the pixel values of the reference pixels adjacent to the target pixel. In addition, the processor 500 may perform a fourth operation of making the target pixels included among the reference pixels. In addition, the processor 500 may complete the demosaiced difference image by repeating the second to fourth operations.

In operation S2005, the processor 500 generates a demosaiced multispectral image based on the demosaiced difference image and the guide image. The processor 500 may generate a plurality of demosaiced difference images by performing operation S2004 on all channels of the MSFA. The processor 500 may generate a demosaiced multispectral image by adding the plurality of demosaiced difference images and the guide image.

Figure 21:
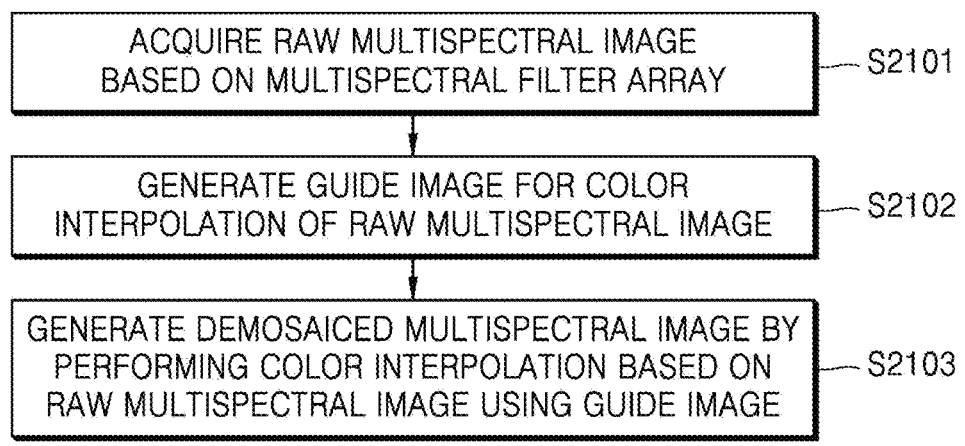

FIG. 21 is a flowchart of a color interpolation method for a MSFA according to an embodiment.

In operation S2101, the processor 500 acquires a raw multispectral image based on the MSFA. The description of operation S2001 may be applied to operation S2101.

In operation S2102, the processor 500 generates a guide image for color interpolation of the raw multispectral image. The description of operation S2002 may be applied to operation S2102.

In operation S2103, the processor 500 generates a demosaiced multispectral image by performing color interpolation based on the raw multispectral image using the guide image. Compared to operations S2003 to S2005, operation S2103 is different from operations S2003 to S2005, in that the former generates a demosaiced multispectral image by performing color interpolation directly on the raw multispectral image without generating the difference image.

In operation S2103, the processor 500 may perform color interpolation based on the raw multispectral image using the binary search method. In more detail, the processor 500 may perform the first operation of setting reference pixels of the demosaiced multispectral image from pixels of the raw multispectral image corresponding to the reference color channel. In addition, the processor 500 may perform the second operation of selecting target pixels located at the same distance from two or more adjacent reference pixels in the demosaiced multispectral image. In addition, for each target pixel, the processor 500 may perform the third operation of generating a pixel value of the target pixel based on the pixel values of the reference pixels adjacent to the target pixel. In addition, the processor 500 may perform the fourth operation of making the target pixels included among the reference pixels. In addition, the processor 500 may repeat the second to fourth operations.

The processor 500 may complete the demosaiced multispectral images by performing operation S2103 on all channels of the MSFA.

The color interpolation method according to embodiments may be applied to various industries/fields. For example, color interpolation methods may be used for image analysis for material analysis, skin analysis, food freshness measurement, product foreign matter analysis, product defect analysis, soil analysis, biometrics, etc. For example, in food analysis, the condition, deterioration, or damage of a food may be more precisely checked by obtaining a high-quality color image using a color interpolation method. For example, in agriculture or digital agriculture, it is possible to diagnose crop conditions, nutrient deficiency/overflow, and pests more precisely by obtaining high-quality color images using color interpolation methods.

Figure 22:
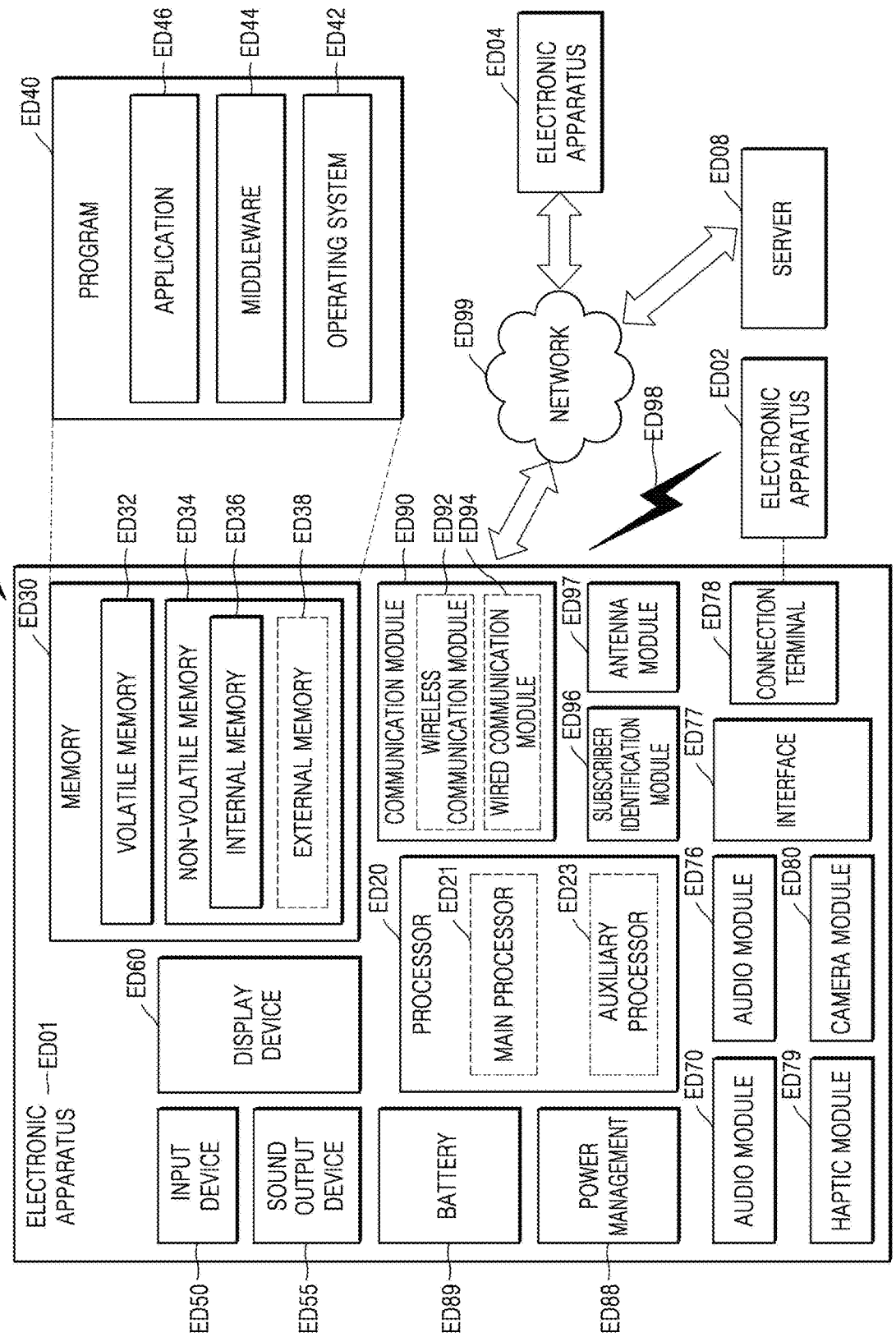
FIG. 22 is a block diagram illustrating a schematic structure of an electronic device according to an embodiment.

FIG. 22 is a block diagram illustrating a schematic structure of an electronic device according to an embodiment. Referring to FIG. 22, under a network environment ED00, the electronic device ED01 may communicate with another electronic device ED02 via a first network ED98 (a short-range wireless communication network, etc.), or may communicate with another electronic device ED04 and/or a server ED08 via a second network ED99 (a long-range wireless communication network, etc.). The electronic device ED01 may communicate with the electronic device ED04 through the server ED08. The electronic device ED01 may include a processor ED20, a memory ED30, an input device ED50, an audio output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. Some (the display device ED60, and the like) of these components may be omitted from or other components may be added to the electronic apparatus ED01. Some of these components may be implemented in one integrated circuit. For example, the sensor module ED76 (fingerprint sensor, iris sensor, illuminance sensor, etc.) may be implemented by being embedded in the display device ED60 (display, etc.). In addition, when the MIS 100 includes a spectral function, some functions (color sensor, illuminance sensor) of the sensor module may be implemented in the MIS 100 itself, not in a separate sensor module.

The processor ED20 may execute software (program ED40 or the like) to control one or a plurality of other components (hardware, software components, etc.) of the electronic apparatus ED01 connected to the processor ED20, and may perform various data processing or operations. As part of data processing or operation, the processor ED20 may load commands and/or data received from other components (sensor modules ED76, communication modules ED90, etc.), process commands and/or data stored in volatile memory ED32, and store the result data in nonvolatile memory ED34. The processor ED20 may include a main processor ED21 (a central processing unit, an application processor, etc.) and an auxiliary processor ED23 (a graphics processing unit, an image signal processor, a sensor hub processor, a communication processor, etc.) that may be operated independently of or together with the main processor ED21. The auxiliary processor ED23 may use less power than the main processor ED21 and perform a specialized function.

The auxiliary processor ED23 may control the functionality and/or status associated with some of the components of the electronic apparatus ED01 (the display device ED60, the sensor module ED76, the communication module ED90, etc.), in place of the main processor ED21 while the main processor ED21 is in an inactive state (sleep state), or in conjunction with the main processor ED21 while the main processor ED21 is in an active state (application execution state). The auxiliary processor ED23 (image signal processor, communication processor, etc.) may be implemented as part of other functionally related components (camera module ED80, communication module ED90, etc.).

The memory ED30 may store various data required by components (processor ED20 and sensor module ED76) of the electronic apparatus ED01. The data may include, for example, input data and/or output data for software (program ED40 or the like) and related commands. The memory ED30 may include a volatile memory ED32 and/or a nonvolatile memory ED34. The nonvolatile memory ED32 may include an internal memory ED36 fixedly mounted in the electronic device ED01 and a detachable external memory ED38.

The program ED40 may be stored in the memory ED30 as software, and may include an operating system ED42, middleware ED44, and/or an application ED46.

The input device ED50 may receive commands and/or data to be used in components (processor ED20, etc.) of the electronic apparatus ED01 from the outside (user, etc.) of the electronic apparatus ED01. The input device ED50 may include a microphone, a mouse, a keyboard, and/or a digital pen (such as a stylus pen).

The sound output device ED55 may output the sound signal to the outside of the electronic apparatus ED01. The sound output device ED55 may include a speaker and/or a receiver. Speakers may be used for general purposes such as multimedia playback or recording playback, and receivers may be used to receive incoming calls. The receiver may be coupled as part of a speaker or may be implemented as an independent separate device.

The display device ED60 may visually provide information to the outside of the electronic apparatus ED01. The display device ED60 may include a display, a hologram device, or a projector and a control circuit for controlling the corresponding device. The display device ED60 may include a touch circuit configured to sense a touch, and/or a sensor circuit (a pressure sensor, etc.) configured to measure an intensity of a force generated by the touch.

The audio module ED70 may convert sound into an electrical signal or conversely convert the electrical signal into sound. The audio module ED70 may acquire sound through the input device ED50 or output sound through the sound output device ED55 and/or a speaker and/or a headphone of another electronic apparatus (e.g., electronic apparatus ED02, etc.) directly or wirelessly connected to the electronic apparatus ED01.

The sensor module ED76 may detect an operating state (power, temperature, etc.) or an external environmental state (user state, etc.) of the electronic apparatus ED01 and generate an electrical signal and/or a data value corresponding to the sensed state. The sensor module ED76 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illumination sensor.

The interface ED77 may support one or more designated protocols that may be used for electronic apparatus ED01 to be directly or wirelessly connected to another electronic apparatus (e.g., electronic apparatus ED02, etc.). The interface ED77 may include a high definition multimedia interface (HDMI), a universal serial bus (USB) interface, an SD card interface, and/or an audio interface.

The connection terminal ED78 may include a connector through which the electronic apparatus ED01 may be physically connected to another electronic apparatus (e.g., electronic apparatus ED02, etc.). The connection terminal ED78 may include an HDMI connector, a USB connector, an SD card connector, and/or an audio connector (such as a headphone connector, etc.).

The haptic module ED79 may convert an electrical signal to a mechanical stimulus (vibration, motion, etc.) or an electrical stimulus that a user can recognize through a tactile or motion sensation. The haptic module ED79 may include a motor, a piezoelectric element, and/or an electrical stimulus.

The camera module ED80 may capture a still image and a moving image. The camera module ED80 may include the image acquisition device 10 described above, and may include additional lens assembly, image signal processors, and/or flashes. The lens assembly included in the camera module ED80 may collect light emitted from an object to be photographed.

The power management module ED88 may manage power supplied to the electronic apparatus ED01. The power management module ED88 may be implemented as part of a power management integrated circuit (PMIC).

The battery ED89 may supply power to components of the electronic apparatus ED01. The battery ED89 may include a non-rechargeable primary battery, a rechargeable secondary battery, and/or a fuel cell.

The communication module ED90 may establish a direct (wired) communication channel and/or wireless communication channel between the electronic apparatus ED01 and another electronic apparatus (the electronic apparatus ED02, the electronic apparatus ED04, the server ED08, etc.), and support communication execution through the established communication channel. The communication module ED90 may include one or more communication processors that operate independently of the processor ED20 (application processor, etc.) and support direct communication and/or wireless communication. The communication module ED90 may include a wireless communication module ED92 (a cellular communication module, a short-range wireless communication module, a GNSS (Global Navigation Satellite System, etc.) communication module, and/or a wired communication module ED94 (a local area network (LAN) communication module, a power line communication module, etc.). A corresponding communication module of these communication modules may communicate with other electronic apparatuses through a first network ED98 (a short-range communication network such as Bluetooth, WiFi Direct, or infrared data association (IrDA)), or a second network ED99 (a long-range communication network such as a cellular network, Internet, or computer network (LAN, WAN, etc.)). These various types of communication modules may be integrated into a single component (such as a single chip, etc.), or may be implemented as a plurality of separate components (multiple chips). The wireless communication module ED92 may identify and authenticate the electronic apparatus ED01 in a communication network such as a first network ED98 and/or a second network ED99 using subscriber information (such as an international mobile subscriber identifier (IMSI) stored in the subscriber identification module ED96.

The antenna module ED97 may transmit a signal and/or power to the outside (such as another electronic apparatus, etc.) or receive the signal and/or power from the outside. The antenna may include a radiator formed of a conductive pattern formed on the substrate (PCB, etc.). The antenna module ED97 may include one or a plurality of antennas. When a plurality of antennas are included, an antenna suitable for a communication scheme used in a communication network such as a first network ED98 and/or a second network ED99 may be selected from among the plurality of antennas by the communication module ED90. A signal and/or power may be transmitted or received between the communication module ED90 and another electronic apparatus through the selected antenna. Other components (RFIC, etc.) in addition to the antenna may be included as a part of the antenna module ED97.

Some of the components may be connected to each other via communication methods between peripherals (such as buses, General Purpose Input and Output (GPIO), Serial Peripheral Interface (SPI), and Mobile Industry Processor Interface (MIPI), etc.) to interchange signals (commands, data, etc.).

The command or data may be transmitted or received between the electronic apparatus ED01 and the external electronic apparatus ED04 through the server ED08 connected to the second network ED99. Other electronic apparatuses ED02 and ED04 may be the same or different types of apparatuses as the electronic apparatus ED01. All or some of the operations executed in the electronic apparatus ED01 may be executed in one or more of the other electronic apparatuses ED02, ED04, and ED08. For example, when the electronic apparatus ED01 needs to perform a function or service, it may request one or more other electronic apparatuses to perform part or all of the function or service instead of executing the function or service on its own. One or more other electronic apparatuses receiving the request may execute an additional function or service related to the request and transmit a result of the execution to the electronic apparatus ED01. To this end, cloud computing, distributed computing, and/or client-server computing technology may be used.

Figure 23:
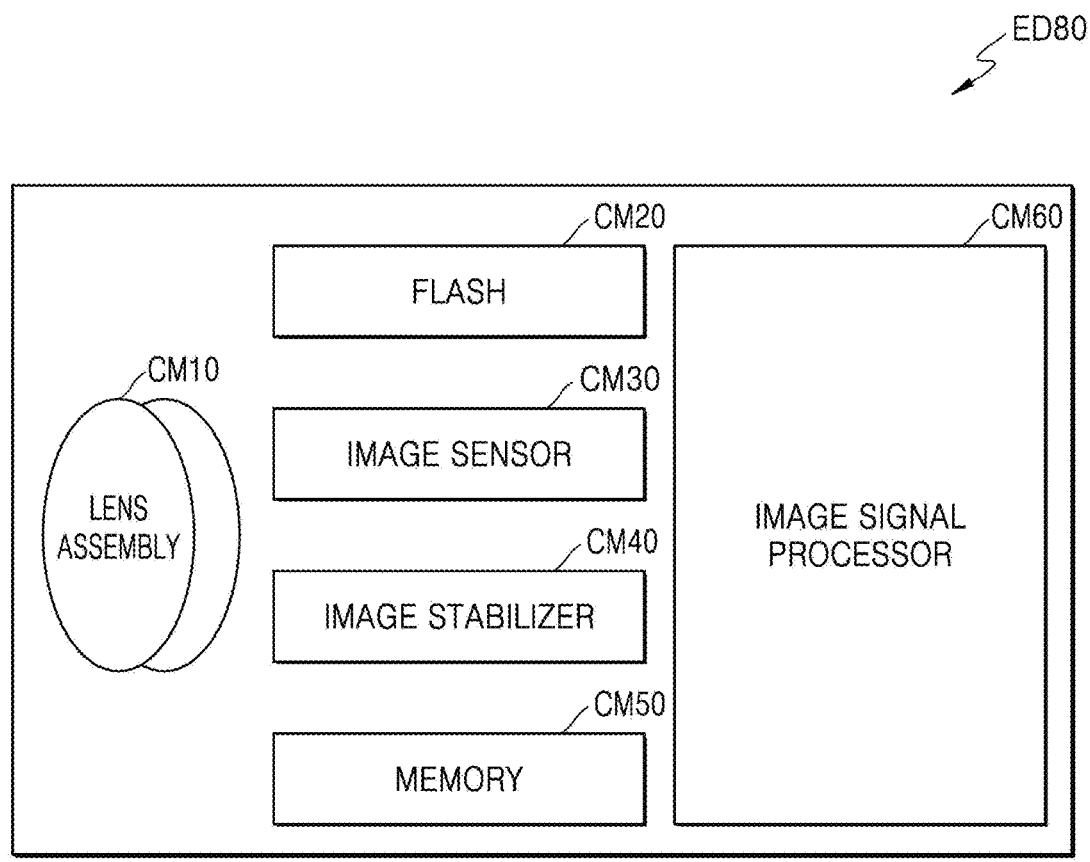
FIG. 23 is a block diagram schematically illustrating a camera module provided in the electronic device of FIG. 22.

FIG. 23 is a block diagram schematically illustrating a camera module ED80 provided in the electronic device of FIG. 22. The camera module ED80 may include the image acquisition device 10 described above or may have a structure modified therefrom. Referring to FIG. 22, the camera module ED80 may include a lens assembly CM10, a flash CM20, an image sensor CM30, an image stabilizer CM40, a memory CM50 (a buffer memory, or the like), and/or an image signal processor CM60.

The image sensor CM30 may include an MIS 100 provided in the image acquisition device 10 described above. The MIS 100 may convert light emitted or reflected from an object and transmitted through the lens assembly CM10 into an electrical signal, to obtain an image corresponding to the object. The MIS 100 may obtain a hyperspectral image having an ultraviolet to infrared wavelength range.

In addition to the MIS 100 described above, the image sensor CM30 may further include one or more sensors selected from image sensors having different properties, such as other RGB sensors, Black and White (BW) sensors, IR sensors, or UV sensors. Each of the sensors included in the image sensor CM30 may be implemented as a charged coupled device (CCD) sensor and/or a Complementary Metal Oxide Semiconductor (CMOS) sensor.

The lens assembly CM10 may collect light emitted from an object to be imaged. The camera module ED80 may include a plurality of lens assemblies CM10, and in this case, the camera module ED80 may be a dual camera, a 360-degree Camera, or a spherical camera. Some of the plurality of lens assemblies CM10 may have the same lens properties (view angle, focal length, autofocus, F Number, optical zoom, etc.), or may have different lens properties. The lens assembly CM10 may include a wide-angle lens or a telephoto lens.

The lens assembly CM10 may be configured and/or focused so that the two image sensors provided in the image sensor CM30 may form an optical image of the object at the same position.

The flash CM20 may emit light used to enhance light emitted or reflected from the object. The flash CM20 may include one or more light emitting diodes (RGB (Red-Green-Blue) LED, White LED, Infrared LED, Ultraviolet LED, etc.), and/or Xenon Lamps.

In response to the movement of the camera module ED80 or the electronic device CM01 including the same, the image stabilizer CM40 may move the one or more lenses or the MIS 100 included in the lens assembly CM10 in a specific direction or control an operation characteristic of the MIS 100 to compensate for a negative impact caused by the movement. The image stabilizer CM40 may detect the movement of the camera module ED80 or the electronic device ED01 by using a gyro sensor (not shown) or an acceleration sensor (not shown) arranged inside or outside the camera module ED80. The image stabilizer CM40 may be implemented optically.

The memory CM50 may store some or all data of an image acquired through the MIS 100 for a next image processing operation. For example, when multiple images are acquired at high speed, the acquired original data (Bayer-Patterned data, high-resolution data, etc.) may be stored in the memory CM50, and used to allow only low-resolution images to displayed, and then the original data of the selected image (user selection, or the like) to be transferred to the image signal processor CM60. The memory CM50 may be integrated into the memory ED30 of the electronic device ED01, or may be configured as a separate memory that operates independently.

The image signal processor CM60 may perform image processes on image obtained through the image sensor CM30 or image data stored in the memory CM50. As described with reference to FIGS. 1 to 21, the color interpolation method for MSFAs may be performed. A configuration of the processor 500 for this purpose may be included in the image signal processor CM60.

In addition, the image processes may include depth map generation, three-dimensional modeling, panorama generation, feature point extraction, image synthesis, and/or image compensation (noise reduction, resolution adjustment, brightness adjustment, blurring interpolation, sharpening, softening, etc.). The image signal processor CM60 may perform control (exposure time control, read-out timing control, etc.) on components (image sensor CM30, etc.) included in the camera module ED80. The image processed by the image signal processor CM60 may be re-stored in the memory CM50 for further processing or may be provided to an external component of the camera module ED80 (memory ED30, display device ED60, electronic device ED02, electronic device ED04, server ED08, etc.). The image signal processor CM60 may be integrated into the processor ED20 or may be configured as a separate processor that operates independently of the processor ED20. When the image signal processor CM60 is configured as a separate processor from the processor ED20, the image processed by the image signal processor CM60 may be displayed through the display device ED60 after additional image processing by the processor ED20.

The electronic device ED01 may include a plurality of camera modules ED80 having different attributes or functions, respectively. In this case, one of a plurality of camera modules ED80 may be a wide-angle camera, and the other may be a telephoto camera. Similarly, one of a plurality of camera modules ED80 may be a front camera, and the other may be a rear camera.

FIGS. 24 to 33 illustrate various examples of an electronic device to which an image acquisition device 10 according to embodiments is applied.

Figure 24:
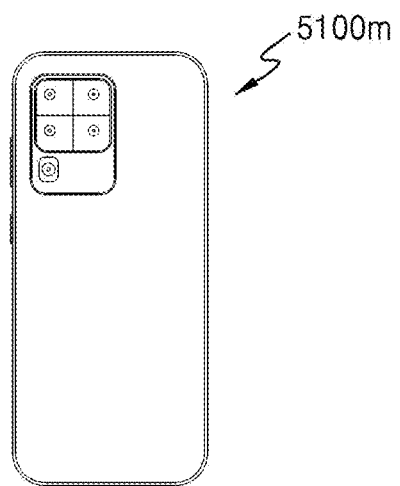
FIGS. 24 to 33 illustrate various examples of an electronic device to which an image acquisition device according to embodiments is applied.
Figure 25:
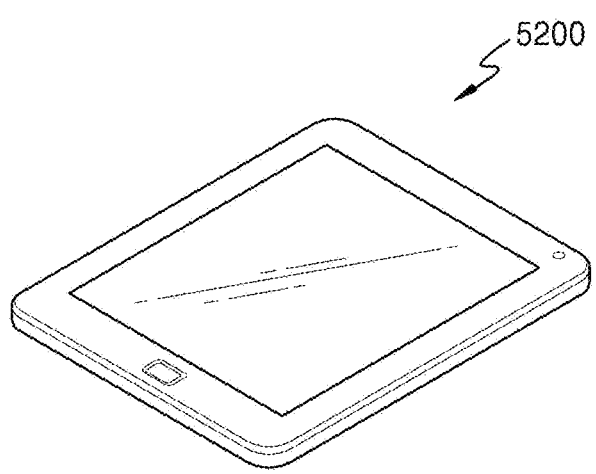
Figure 26:
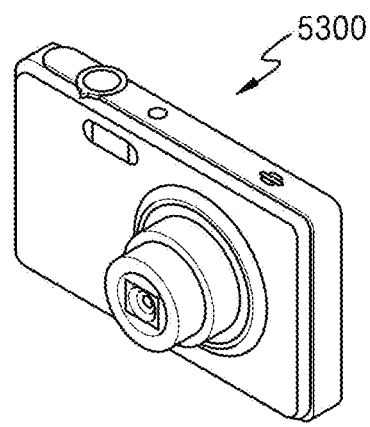
Figure 27:
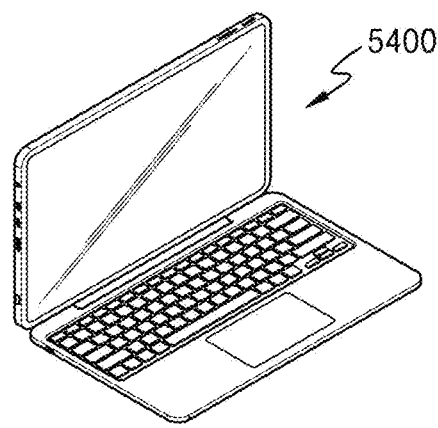
Figure 28:
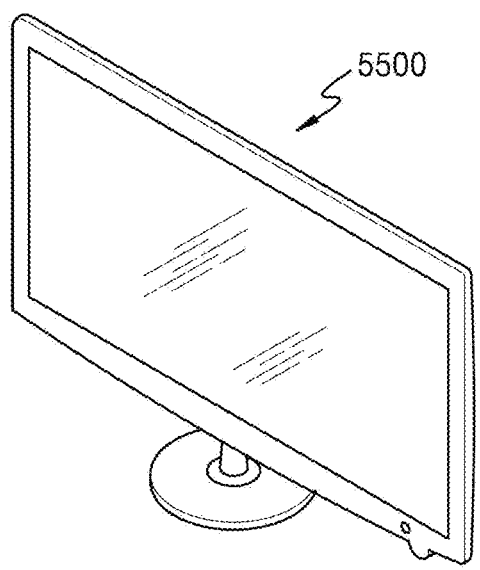

The image acquisition device 10 according to embodiments may be applied to the mobile phone or smart phone 5100m shown in FIG. 24, the tablet or smart tablet 5200 shown in FIG. 25, the digital camera or camcorder 5300 shown in FIG. 26, the laptop computer 5400 shown in FIG. 27, or the television or smart television 5500 shown in FIG. 28. For example, the smartphone 5100m or the smart tablet 5200 may include a plurality of high-resolution cameras each equipped with a high-resolution image sensor. It is possible to extract depth information of objects in an image, adjust auto focusing of the image, or automatically identify objects in the image using high-resolution cameras.

Figure 29:
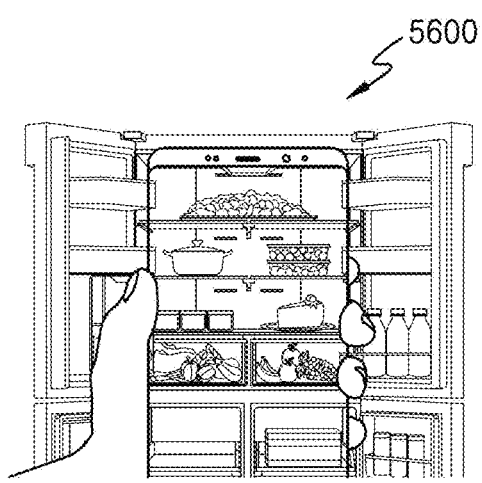
Figure 30:
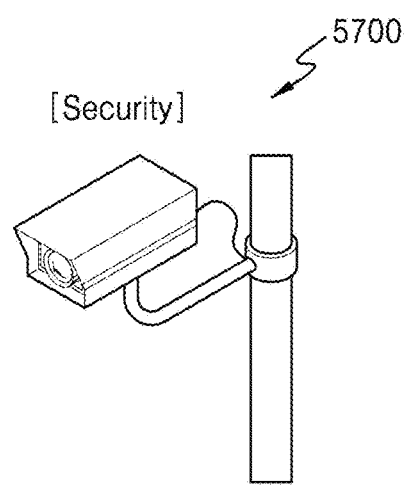
Figure 31:
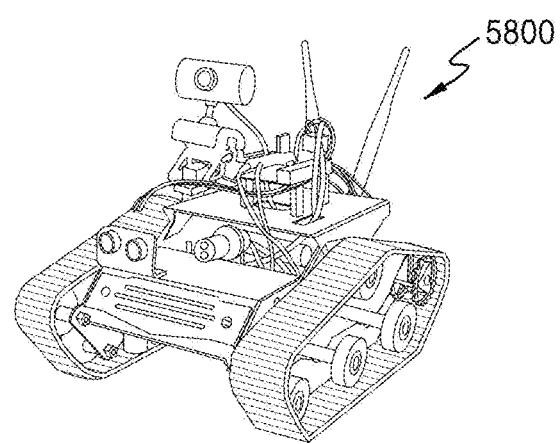
Figure 32:
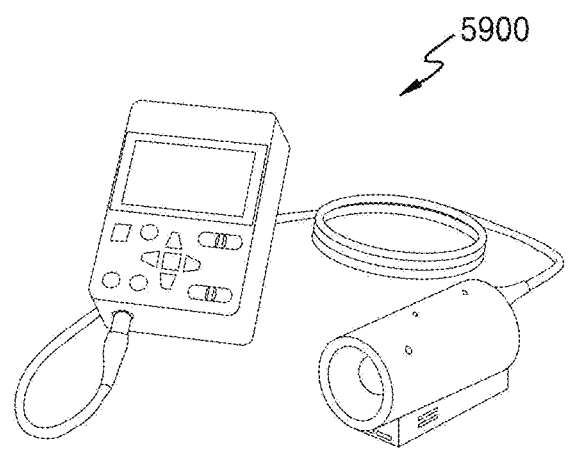

In addition, the image acquisition device 10 may be applied to the smart refrigerator 5600 shown in FIG. 29, the security camera 5700 shown in FIG. 30, the robot 5800 shown in FIG. 31, and the medical camera 5900 shown in FIG. 32. For example, the smart refrigerator 5600 may automatically recognize food in the refrigerator using the image acquisition device 10 and inform a user of the presence of a specific food, the type of food that is received or released, and the like through a smartphone. The security camera 5700 may provide an ultra-high-resolution image and may enable recognition of objects or people in the image even in a dark environment by using high sensitivity. The robot 5800 may be provided into a disaster or industrial site that is not directly accessible by humans to provide a high-resolution image. The medical camera 5900 may provide a high-resolution image for diagnosis or surgery and may dynamically adjust the field of view.

Figure 33:
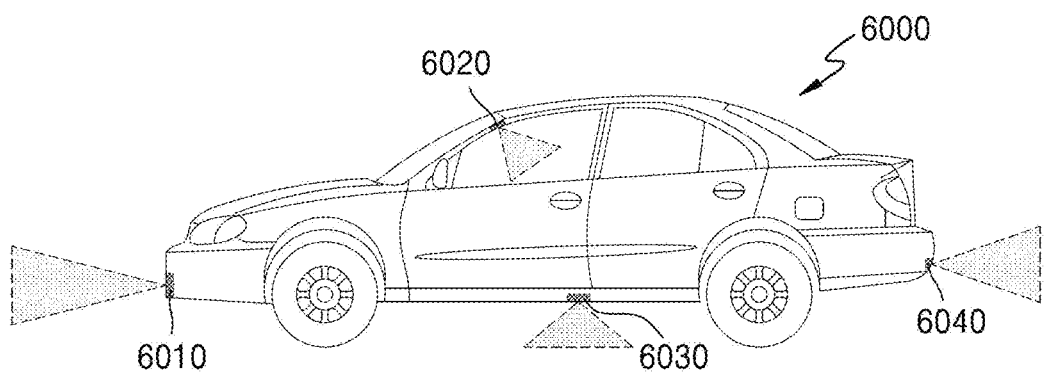

In addition, the image acquisition device 10 may be applied to the vehicle 6000 as illustrated in FIG. 33. The vehicle 6000 may include a plurality of vehicle cameras 6010, 6020, 6030, and 6040 arranged at various locations. Each of the vehicle cameras 6010, 6020, 6030, and 6040 may include an image acquisition device according to an embodiment. The vehicle 6000 may provide various information about the inside or surrounding of the vehicle 6000 to the driver using a plurality of vehicle cameras 6010, 6020, 6030, and 6040, and may automatically recognize objects or people in an image to provide information necessary for autonomous driving.

The image acquisition device, and the electronic device including the image acquisition device have been described with reference to the embodiments shown in the drawings, but this is only an example, and those of ordinary skill in the art will understand that various modifications and equivalent other embodiments are possible. Therefore, the disclosed embodiments should be considered from an explanatory point of view rather than a limiting point of view. The scope of the right is defined not by the detailed description but by the appended claims, and all differences within the scope will be construed as being included in the scope of the right.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. A color interpolation method for a multispectral filter array (MSFA), the color interpolation method comprising:
acquiring a raw multispectral image based on the MSFA;
generating a guide image for color interpolation of the raw multispectral image;
generating a difference image between the raw multispectral image and the guide image,
generating a demosaiced difference image by performing color interpolation based on the difference image, and
generating a demosaiced multispectral image based on the demosaiced difference image and the guide image,
wherein the generating of the guide image comprises:
generating a low-frequency multispectral image by filtering the raw multispectral image by using a low-pass filter;
generating a high-frequency multispectral image based on a difference between the raw multispectral image and the low-frequency multispectral image; and
generating the guide image by adding the low-frequency multispectral image and the high-frequency multispectral image.

2. The color interpolation method of claim 1, wherein the generating of the demosaiced difference image comprises:
a first operation of setting reference pixels of the demosaiced difference image from pixels of the difference image corresponding to a reference color channel;
a second operation of selecting target pixels located at same distance from two or more adjacent reference pixels in the demosaiced difference image;
a third operation of generating, for each target pixel, a pixel value of a target pixel based on pixel values of reference pixels adjacent to the target pixel,
a fourth operation in which the target pixels are included among the reference pixels, and
an operation of repeating the second to fourth operations.

3. The color interpolation method of claim 2, wherein the first operation comprises setting the reference pixels of the demosaiced difference image by masking pixels that do not correspond to the reference color channel in the difference image.

4. The color interpolation method of claim 2, wherein the first operation comprises setting the reference pixels of the demosaiced difference image by sampling pixels that correspond to the reference color channel in the difference image.

5. The color interpolation method of claim 2, wherein the second operation comprises selecting the target pixels located at the same distance from four adjacent reference pixels.

6. The color interpolation method of claim 2, wherein the third operation comprises:
generating weight data for reference pixels adjacent to the target pixel based on the pixel values of the guide image; and
generating a pixel value of the target pixel from a weighted sum of pixel values of reference pixels adjacent to the target pixel based on the weight data.

7. The color interpolation method of claim 6, wherein the generating of the weight data comprises generating the weight data based on a gradient between pixel values of pixels of the guide image corresponding to the target pixel and pixel values of pixels of the guide image corresponding to reference pixels adjacent to the target pixel.

8. The color interpolation method of claim 2, wherein the generating of the demosaiced difference image comprises generating a plurality of demosaiced difference images by performing the first operation, the second operation, the third operation, the fourth operation, and the operation of repeating by using each channel of the multispectral filter array as the reference color channel.

9. The color interpolation method of claim 8, wherein the generating of the demosaiced multispectral image comprises generating the demosaiced multispectral image by adding the plurality of demosaiced difference images and the guide image.

10. The color interpolation method of claim 1, wherein the generating of the guide image comprises:
acquiring a raw guide image based on a color filter array having a number of color channels less than a number of color channels of the multispectral filter array; and
generating the guide image by performing image registration on the raw guide image.

11. The color interpolation method of claim 10, wherein the color filter array comprises an RGB color filter array.

12. The color interpolation method of claim 1, wherein the generating of the guide image comprises:
acquiring a monochrome image; and
generating the guide image by performing image registration on the monochrome image.

13. The color interpolation method of claim 1, wherein the multispectral filter array has four or more color channels.

14. A color interpolation method for a multispectral filter array (MSFA), the color interpolation method comprising:
acquiring a raw multispectral image based on the MSFA;
generating a guide image for color interpolation of the raw multispectral image, and
generating a demosaiced multispectral image by performing color interpolation based on the raw multispectral image by using the guide image, wherein
the generating of the demosaiced multispectral image comprises:
a first operation of setting reference pixels of the demosaiced multispectral image from the pixels of the raw multispectral image corresponding to a reference color channel;
a second operation of selecting target pixels located at the same distance from two or more adjacent reference pixels in the demosaiced multispectral image;
a third operation of generating a pixel value of a target pixel based on pixel values of reference pixels adjacent to the target pixel for each target pixel,
a fourth operation in which the target pixels are included among the reference pixels, and
an operation of repeating the second to fourth operations, and
wherein the generating of the guide image comprises:
generating a low-frequency multispectral image by filtering the raw multispectral image by using a low-pass filter;
generating a high-frequency multispectral image based on a difference between the raw multispectral image and the low-frequency multispectral image; and
generating the guide image by adding the low-frequency multispectral image and the high-frequency multispectral image.

15. The color interpolation method of claim 14, wherein the third operation comprises:
generating weight data for reference pixels adjacent to the target pixel based on the pixel values of the guide image; and
generating a pixel value of the target pixel from a weighted sum of pixel values of reference pixels adjacent to the target pixel based on the weight data.

16. The color interpolation method of claim 15, wherein the generating of the weight data comprises generating the weight data based on a gradient between pixel values of pixels of the guide image corresponding to the target pixel and pixel values of pixels of the guide image corresponding to reference pixels adjacent to the target pixel.

17. An image acquisition device comprising:
- a multispectral image sensor including a multispectral filter array; and a processor, wherein the processor is configured to:
- acquire a raw multispectral image from the multispectral image sensor;
- generate a guide image for color interpolation of the raw multispectral image;
- generate a difference image between the raw multispectral image and the guide image;
- generate a demosaiced difference image by performing color interpolation based on the difference image; and
- generate a demosaiced multispectral image based on the demosaiced difference image and the guide image, and
- wherein the processor generates the guide image comprising:
- generating a low-frequency multispectral image by filtering the raw multispectral image by using a low-pass filter;
- generating a high-frequency multispectral image based on a difference between the raw multispectral image and the low-frequency multispectral image; and
- generating the guide image by adding the low-frequency multispectral image and the high-frequency multispectral image.

18. The image acquisition device of claim 17, wherein the processor is further configured to perform:
- a first operation of setting reference pixels of the demosaiced difference image from the pixels of the difference image corresponding to a reference color channel;
- a second operation of selecting target pixels located at the same distance from two or more adjacent reference pixels in the demosaiced difference image;
- a third operation of generating a pixel value of a target pixel based on pixel values of reference pixels adjacent to the target pixel for each target pixel;
- a fourth operation in which the target pixels are included among the reference pixels; and
- an operation of repeating the second to fourth operations.

19. The image acquisition device of claim 18, wherein the processor is further configured to:
- generate weight data for reference pixels adjacent to the target pixel based on the pixel values of the guide image; and
- generate a pixel value of the target pixel from a weighted sum of pixel values of reference pixels adjacent to the target pixel based on the weight data.

* * * * *